(12) United States Patent
Liu et al.

(10) Patent No.: US 11,879,853 B2
(45) Date of Patent: Jan. 23, 2024

(54) CONTINUOUS DEGENERATE ELLIPTICAL RETARDER FOR SENSITIVE PARTICLE DETECTION

(71) Applicant: KLA Corporation, Milpitas, CA (US)

(72) Inventors: Xuefeng Liu, San Jose, CA (US); Jenn-Kuen Leong, San Jose, CA (US); Yung-Ho Alex Chuang, Cupertino, CA (US); John Fielden, Los Altos, CA (US)

(73) Assignee: KLA Corporation, Milpitas, CA (US)

( * ) Notice: Subject to any disclaimer, the term of this patent is extended or adjusted under 35 U.S.C. 154(b) by 152 days.

(21) Appl. No.: 17/672,832

(22) Filed: Feb. 16, 2022

(65) Prior Publication Data
US 2022/0268710 A1      Aug. 25, 2022

Related U.S. Application Data

(60) Provisional application No. 63/151,068, filed on Feb. 19, 2021.

(51) Int. Cl.
*G01N 21/95*      (2006.01)
*G01N 21/47*      (2006.01)
(Continued)

(52) U.S. Cl.
CPC ......... *G01N 21/9501* (2013.01); *G01N 21/47* (2013.01); *G02B 27/281* (2013.01);
(Continued)

(58) Field of Classification Search
CPC ............... G01N 21/47; G01N 21/9501; G01N 2021/8822; G01N 2021/8848;
(Continued)

(56) References Cited

U.S. PATENT DOCUMENTS 5,818,626 A * 10/1998 Engstrom ............... G02F 1/093
                                                             359/489.08
8,891,079 B2    11/2014 Zhao et al.
(Continued)

FOREIGN PATENT DOCUMENTS

JP       2010096596 A      4/2010
KR    1020180028787 A      3/2018

OTHER PUBLICATIONS

International Search Report and Written Opinion in PCT/US2022/016882 dated Jun. 9, 2022, 8 pages.

*Primary Examiner* — Tri T Ton
(74) *Attorney, Agent, or Firm* — Suiter Swantz pc llo

(57) ABSTRACT

An inspection system may include an illumination source to generate an illumination beam, illumination optics to direct the illumination beam to a sample at an off-axis angle along an illumination direction, and collection optics to collect scattered light from the sample in a dark-field mode, where the scattered light from the sample includes surface haze associated with light scattered from a surface of the sample, and where at least a at least a portion of the surface haze has elliptical polarizations. The system may further include pupil-plane optics to convert the polarizations of the surface haze across the pupil to linear polarization that is aligned parallel to a selected haze orientation direction. The system may include a linear polarizer to reject the surface haze aligned parallel to this haze orientation direction and a detector to generate a dark-field image of the sample based on light passed by the linear polarizer.

52 Claims, 21 Drawing Sheets

(51) Int. Cl.
  *G02B 27/28* (2006.01)
  *H04N 23/56* (2023.01)
  *H04N 23/75* (2023.01)

(52) U.S. Cl.
  CPC .......... *G02B 27/283* (2013.01); *H04N 23/56* (2023.01); *H04N 23/75* (2023.01)

(58) Field of Classification Search
  CPC .............. G01N 21/8806; G02B 27/281; G02B 27/283; H04N 23/56; H04N 23/75
  See application file for complete search history.

(56) References Cited

U.S. PATENT DOCUMENTS

| | | |
|---|---|---|
| 9,291,575 B2 | 3/2016 | Zhao et al. |
| 9,874,526 B2 | 1/2018 | Liu et al. |
| 9,891,177 B2 | 2/2018 | Vazhaeparambil et al. |
| 10,942,135 B2 | 3/2021 | Leong et al. |
| 10,948,423 B2 | 3/2021 | Liu et al. |
| 2014/0361152 A1 | 12/2014 | Maleev et al. |
| 2015/0054941 A1 | 2/2015 | Ogawa |
| 2018/0088469 A1 | 3/2018 | Otani et al. |
| 2020/0264109 A1 | 8/2020 | Liu et al. |

\* cited by examiner

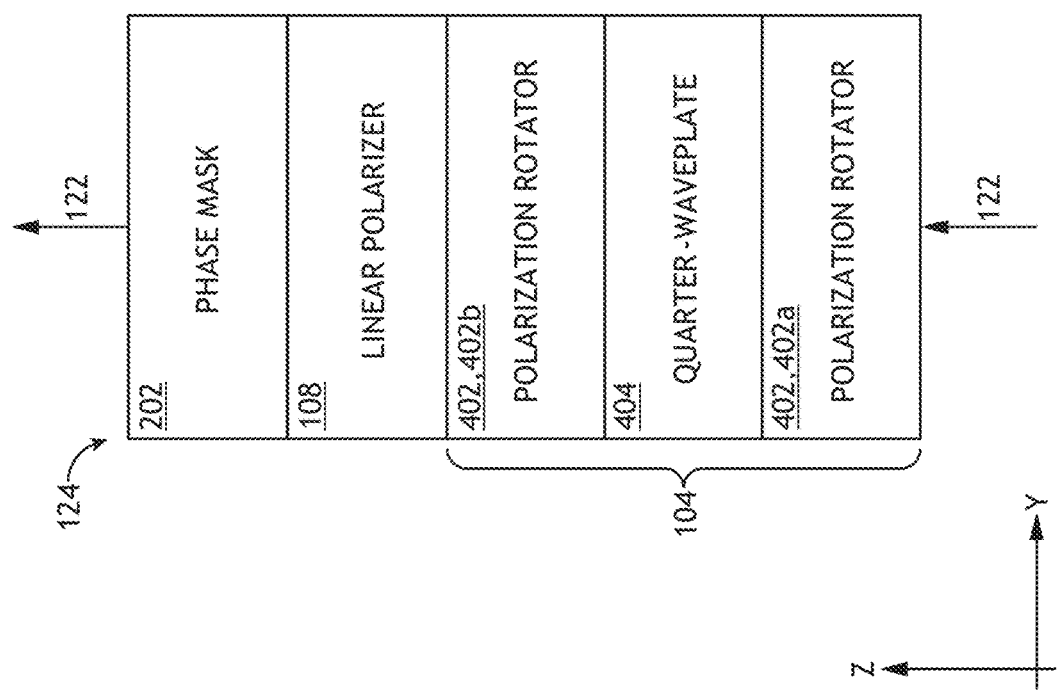

CONTINUOUS DEGENERATE ELLIPTICAL RETARDER FOR SENSITIVE PARTICLE DETECTION

CROSS-REFERENCE TO RELATED APPLICATION

The present application claims the benefit under 35 U.S.C. § 119(e) of U.S. Provisional Application Ser. No. 63/151,068, filed Feb. 19, 2021, entitled ADVANCED METHOD TO IMPROVE PARTICLE DETECTION SENSITIVITY IN WAFER INSPECTION, naming Xuefeng Liu, Jenn-Kuen Leong, Alex Chuang, and John Fielden as inventors, which is incorporated herein by reference in the entirety.

TECHNICAL FIELD

The present disclosure is generally related to particle inspection and, more particularly, to particle inspection using dark-field imaging based on scattered or diffracted light.

BACKGROUND

Particle detection systems are commonly utilized in semiconductor processing lines to identify defects or particulates on wafers such as, but not limited to, unpatterned wafers. As semiconductor devices continue to shrink, particle detection systems require corresponding increases in sensitivity and resolution. A significant source of noise that may limit measurement sensitivity is surface scattering on a wafer (e.g., surface haze), which may be present even for optically polished surfaces. While various methods have been proposed to suppress surface scattering with respect to scattering from particles, such methods may fail to achieve desired sensitivity levels and/or may achieve sensitivity at the expense of degraded image quality. There is therefore a need to develop systems and methods that mitigate the deficiencies addressed above.

SUMMARY

An inspection system is disclosed in accordance with one or more embodiments of the present disclosure. In one illustrative embodiment, the system includes an illumination source to generate an illumination beam. In another illustrative embodiment, the system includes one or more illumination optics to direct the illumination beam to a sample at an off-axis angle along an illumination direction. In another illustrative embodiment, the system includes one or more collection optics to collect scattered light from the sample in response to the illumination beam in a dark-field mode, where the scattered light from the sample collected by the one or more collection optics includes surface haze associated with light scattered from a surface of the sample, and where at least a portion of the surface haze has elliptical polarizations. In another illustrative embodiment, the system includes one or more optical elements located at one or more pupil planes of the one or more collection optics (e.g., pupil-plane optics). In another illustrative embodiment, the pupil-plane optics include a first polarization rotator providing a first spatially-varying polarization rotation distribution to rotate the surface haze to a selected orientation direction, where rotation of the surface haze includes rotation of long axes of the elliptical polarizations to the selected orientation direction. In another illustrative embodiment, the pupil-plane optics include a quarter-wave plate to convert the surface haze from the first polarization rotator to linear polarizations. In another illustrative embodiment, the pupil-plane optics include a second polarization rotator providing a second spatially-varying polarization rotation distribution to rotate the linear polarizations of the surface haze from the quarter-wave plate to a selected haze orientation direction. In another illustrative embodiment, the system includes a linear polarizer aligned to reject light polarized parallel to the selected haze orientation direction to reject the surface haze from the second polarization rotator. In another illustrative embodiment, the system includes a detector to generate a dark-field image of the sample based on scattered light from the sample passed by the linear polarizer, where the scattered light from the sample passed by the linear polarizer includes at least a portion of light scattered by one or more particles on the surface of the sample.

An inspection system is disclosed in accordance with one or more embodiments of the present disclosure. In one illustrative embodiment, the system includes an illumination source to generate an illumination beam. In another illustrative embodiment, the system includes one or more illumination optics to direct the illumination beam to a sample at an off-axis angle along an illumination direction. In another illustrative embodiment, the system includes one or more collection optics to collect scattered light from the sample in response to the illumination beam in a dark-field mode, where the scattered light from the sample collected by the one or more collection optics includes surface haze associated with light scattered from a surface of the sample, and where at least a portion of the surface haze has elliptical polarizations. In another illustrative embodiment, the system includes one or more optical elements located at one or more pupil planes of the one or more collection optics (e.g., pupil-plane optics). In another illustrative embodiment, the pupil-plane optics include a polarization rotator providing a spatially-varying polarization rotation distribution to rotate the surface haze to a selected orientation distribution, where rotation of the surface haze includes rotation of long axes of the elliptical polarizations to the selected orientation distribution. In another illustrative embodiment, the pupil-plane optics include a segmented quarter-wave plate to convert the surface haze from the polarization rotator to linear polarizations, where the linear polarizations are aligned along a selected haze orientation direction. In another illustrative embodiment, the system includes a linear polarizer aligned to reject light polarized parallel to the selected haze orientation direction to reject the surface haze from the segmented quarter-wave plate. In another illustrative embodiment, the system includes a detector to generate a dark-field image of the sample based on scattered light from the sample passed by the linear polarizer, where the scattered light from the sample passed by the linear polarizer includes at least a portion of light scattered by one or more particles on the surface of the sample.

An inspection system is disclosed in accordance with one or more embodiments of the present disclosure. In one illustrative embodiment, the system includes an illumination source to generate an illumination beam. In another illustrative embodiment, the system includes one or more illumination optics to direct the illumination beam to a sample at an off-axis angle along an illumination direction. In another illustrative embodiment, the system includes one or more collection optics to collect scattered light from the sample in response to the illumination beam in a dark-field mode, where the scattered light from the sample collected by the one or more collection optics includes surface haze associated with light scattered from a surface of the sample, and where at least a portion of the surface haze has elliptical polarizations. In another illustrative embodiment, the system includes one or more optical elements located at one or more pupil planes of the one or more collection optics (e.g., pupil-plane optics). In another illustrative embodiment, the pupil-plane optics include a spatially varying waveplate located at a pupil plane of the one or more collection optics to convert the surface haze to linear polarizations. In another illustrative embodiment, the pupil-plane optics include a polarization rotator providing a spatially-varying polarization rotation distribution to rotate the surface haze from the spatially-varying waveplate to a selected orientation distribution, where rotation of the surface haze includes rotation of long axes of the elliptical polarizations to a selected haze orientation direction. In another illustrative embodiment, the system includes a linear polarizer aligned to reject light polarized parallel to the selected haze orientation direction to reject the surface haze from the polarization rotator. In another illustrative embodiment, the system includes a detector to generate a dark-field image of the sample based on scattered light from the sample passed by the linear polarizer, where the scattered light from the sample passed by the linear polarizer includes at least a portion of light scattered by one or more particles on the surface of the sample.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 4A is a conceptual view of a first configuration of a collection pathway of an inspection tool including a continuous degenerate elliptical retarder (CDER), in accordance with one or more embodiments of the present disclosure.

DETAILED DESCRIPTION

Figure 1A:
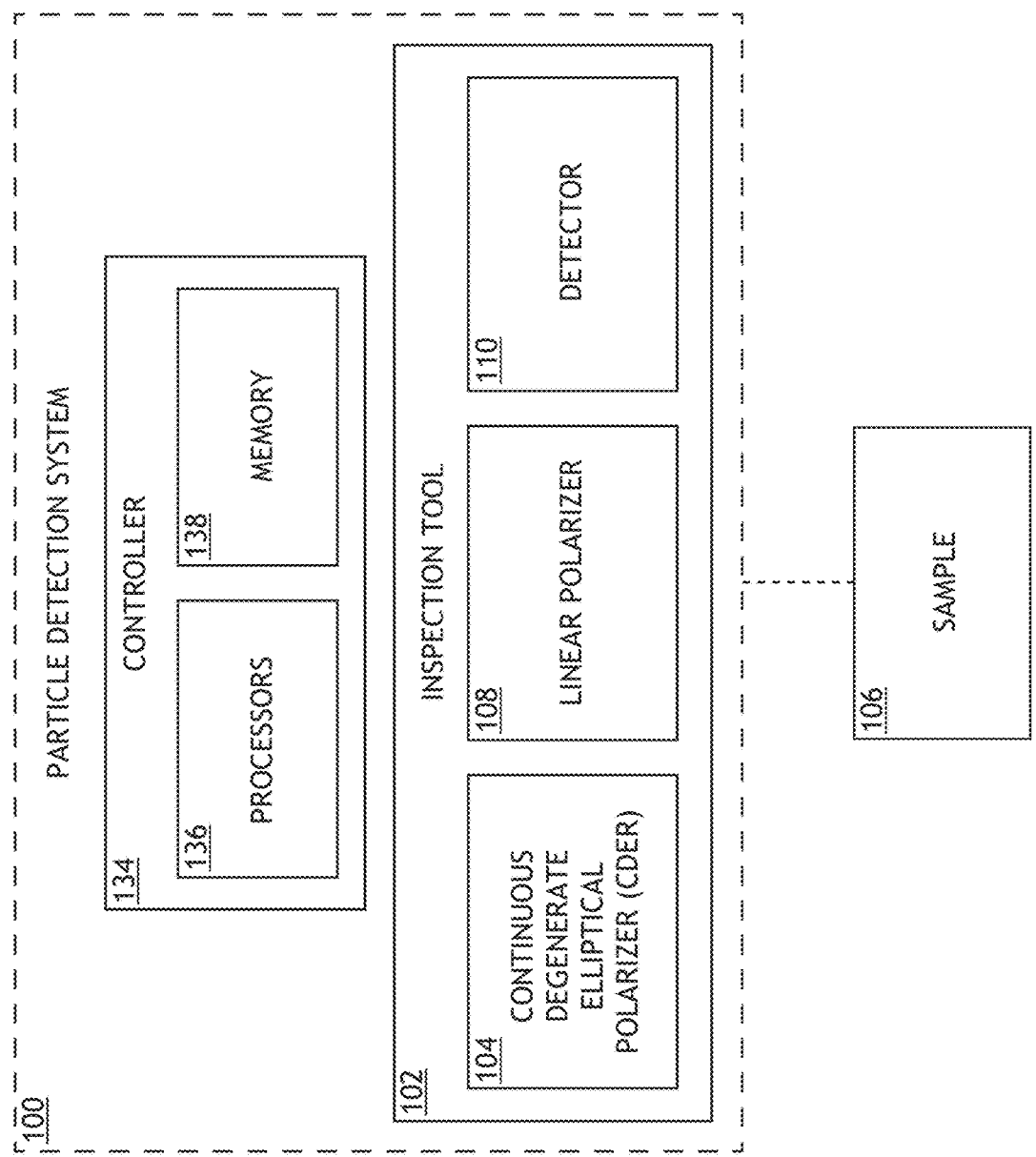
FIG. 1A is a block diagram view of a particle detection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for particle detection based on dark-field imaging in which surface scattering (e.g., surface haze) is separated from light scattered by particles on a surface (e.g., particle scattering). Additional embodiments of the present disclosure are directed to simultaneously generating separate images of a sample based on surface scattering and particle scattering.

Wafer inspection is generally described in U.S. Pat. No. 9,874,526 issued on Jan. 1, 2018, U.S. Pat. No. 9,291,575 issued on Mar. 22, 2016, U.S. Pat. No. 8,891,079 issued on Nov. 18, 2014, and U.S. Pat. No. 9,891,177 issued on Feb. 13, 2018, all of which are incorporated herein in their entirety. Further, for the purposes of this disclosure, a particle may include any surface defect on a sample of interest including, but not limited to, a foreign particulate, a scratch, a pit, a hole, a bump, or the like.

It is recognized herein that light scattered from a particle and light scattered from a surface may exhibit different electric field distributions (e.g., polarization and electric field strength) as a function of scattering angle. Further, differences in the electric field distribution (e.g., scattering map) of these scattering sources may be particularly significant for obliquely-incident p-polarized light. For example, surface haze from obliquely-incident p-polarized light may have elliptical polarization and may be approximately radially polarized with respect to an angle of specular reflection, whereas scattering from a particle may be approximately radially polarized with respect to a surface normal. In this way, surface haze may be isolated from particle scattering at least in part based on these polarization differences. As an illustration, surface haze suppression using a continuous radial polarizer is generally described in U.S. Pat. No. 10,942,135 issued on Mar. 9, 2021, which is incorporated herein by reference in its entirety. As another illustration, surface haze suppression using a combination of segmented half-wave plates along with a linear polarizer is described generally in U.S. Pat. No. 10,948,423, which is incorporated herein by reference in its entirety. However, it is contemplated herein that existing techniques such as these may fail to fully convert the elliptical polarization states of surface haze across the pupil to a linear polarization and/or may fail to fully align the polarizations of the surface haze along a common direction, which may result in leakage of surface haze through the linear polarizer and a corresponding reduced signal to noise ratio.

In some embodiments, surface haze is isolated and separated using a continuous degenerate elliptical retarder, herein referred to as a CDER for convenience, along with a linear polarizer or polarizing beamsplitter. For example, a CDER may be an optical element designed for placement in a pupil plane of an optical system that may functionally convert the polarization ellipses associated with surface haze across the pupil plane to linear polarizations oriented along a common angle. In this way, a linear polarizer may separate light associated with surface haze from light associated with particle scattering. As a result, particle detection may be achieved with a high sensitivity. In some embodiments, a system further includes a phase mask (e.g., a pi-phase mask) to sharpen the point spread function (PSF) and further increase a signal to noise ratio (SNR) of light scattered by particles and thus increase particle detection sensitivity.

In some embodiments, the CDER may be functionally decomposed into a first polarization rotator (e.g., optical rotator, a segmented or continuous half-wave plate, or the like), a quarter-wave plate, and a second polarization rotator, where at least some of the components provide spatially-varying transformations across the pupil to provide tailored isolation of the surface haze. In this configuration, the first polarization rotator may rotate the elliptically-polarized surface haze across the pupil plane to a common orientation direction. It is contemplated herein that this first polarization rotator may be similar in function and/or physical construction to the polarization rotation technique disclosed in U.S. Pat. No. 10,948,423 incorporated herein by reference above, though it is to be understood that this is merely an illustrative comparison and not a limitation of the present disclosure. However, it is further contemplated herein that merely rotating the elliptically-polarized surface haze to the common orientation direction may not provide adequate isolation and/or suppression of the surface haze by a subsequent linear polarizer. In particular, the polarization components orthogonal to the common orientation direction will not be suppressed by the subsequent linear polarizer and will thus result in a lower extinction ratio of the surface haze and a lower signal to noise ratio associated with particle scattering.

To address this, the CDER may further include a quarter-wave plate to transform the elliptical polarizations to linear polarizations. However, this linearly-polarized surface haze may no longer be aligned (e.g., along the common orientation direction). In particular, the orientation of linearly-polarized surface haze after the quarter-wave plate may depend on the eccentricity of the elliptically-polarized light. The CDER may then include a second polarization rotator to rotate the linearly-polarized surface haze to the common orientation direction (or any other selected orientation direction). It is contemplated herein that this technique may transform the varying polarization ellipses of surface haze across the pupil plane to linearly polarized light oriented along any selected (but arbitrary) direction to allow for highly-efficient isolation and/or suppression using a subsequent linear polarizer or polarizing beamsplitter.

However, it is contemplated herein that the CDER may be implemented in various ways. In some embodiments, the CDER includes a single polarization rotator and a quarter-wave plate. In this configuration, the polarization rotator may not rotate the elliptically-polarized light across the pupil to a common orientation direction. Rather, the polarization rotator may compensate for the subsequent action of the quarter-wave plate such that the polarization states of the surface haze across the pupil are aligned only after passing through the quarter-wave plate. In particular, since the quarter-wave plate produces linearly-polarized light at different directions depending on the eccentricity of the input light, the polarization rotator may compensate for this variation by rotating the surface haze by different amounts across the pupil plane based on the eccentricity distribution. In this way, the second polarization rotator described above is not necessary. Further, in some embodiments, the quarter-wave plate is provided prior to the polarization rotator. In this configuration, the surface haze is first converted to linear polarization and then rotated to a common orientation direction for subsequent isolation and/or suppression by the linear polarizer.

It is contemplated herein that a CDER for isolation and suppression of surface haze for the purposes of particle detection may provide numerous benefits. For example, the CDER may provide both conversion of elliptically polarized surface haze across the pupil to linearly polarized light and rotation of the linearly polarized light to a common angle (e.g., a rejection angle) for rejection using a linear polarizer. As a result, surface haze may be isolated and suppressed with a high extinction ratio for highly sensitive particle detection.

In some embodiments, the CDER is provided as a single optical element. In this way, the CDER may be easily placed in a pupil plane of an imaging system. The CDER may be provided as a single optical element or multiple optical elements. It is contemplated herein that the design of a particular optical system may limit the thickness or number of optical elements that may be placed at a particular pupil plane or sufficiently close to a particular pupil plane to provide a desired effect within a selected tolerance. For the purposes of the present disclosure, descriptions indicating a placement of elements such as a CDER in a pupil plane may be understood as placement of the CDER, or a component thereof, within a range of distances from the pupil plane that provides a desired level of performance by a selected metric (e.g., an extinction ratio of surface haze when coupled with a linear polarizer, or the like). Further, it is to be understood that an optical system may include any number of optical relays to provide any number of conjugate pupil planes at which the CDER or components thereof may be placed. In this way, descriptions indicating a placement of the CDER in a pupil plane herein may be understood to include any arrangement of CDER components in any number of conjugate pupil planes.

Referring now to FIGS. 1 through 7, systems and methods for sensitive particle detection are described in greater detail, in accordance with one or more embodiments of the present disclosure.

FIG. 1A is a block diagram view of a particle detection system 100, in accordance with one or more embodiments of the present disclosure.

In some embodiments, the particle detection system 100 includes an inspection tool 102 with a CDER 104 to provide inspection data associated with particles on a sample 106 while suppressing and/or isolating surface haze. For example, the inspection tool 102 may include the CDER 104 in a collection pupil plane to manipulate surface haze to be linearly polarized along a selected haze orientation direction. The inspection tool 102 may further include a linear polarizer 108 oriented to suppress the surface haze along the haze orientation direction from the sample light 122 and at least one detector 110 to generate inspection data based on the sample light 122 after suppression of the surface haze.

The linear polarizer 108 may be formed as any type of polarizer known in the art. In some embodiments, the linear polarizer 108 absorbs the surface haze along the haze orientation direction. In some embodiments, the linear polarizer 108 is formed as a polarizing beamsplitter. In this way, the linear polarizer 108 may direct the surface haze along one optical path (e.g., to isolate the surface haze) and direct the remaining light along an additional optical path. The inspection tool 102 may then optionally include an additional detector 110 to measure a portion of the sample light 122 associated with the surface haze.

Figure 1B:
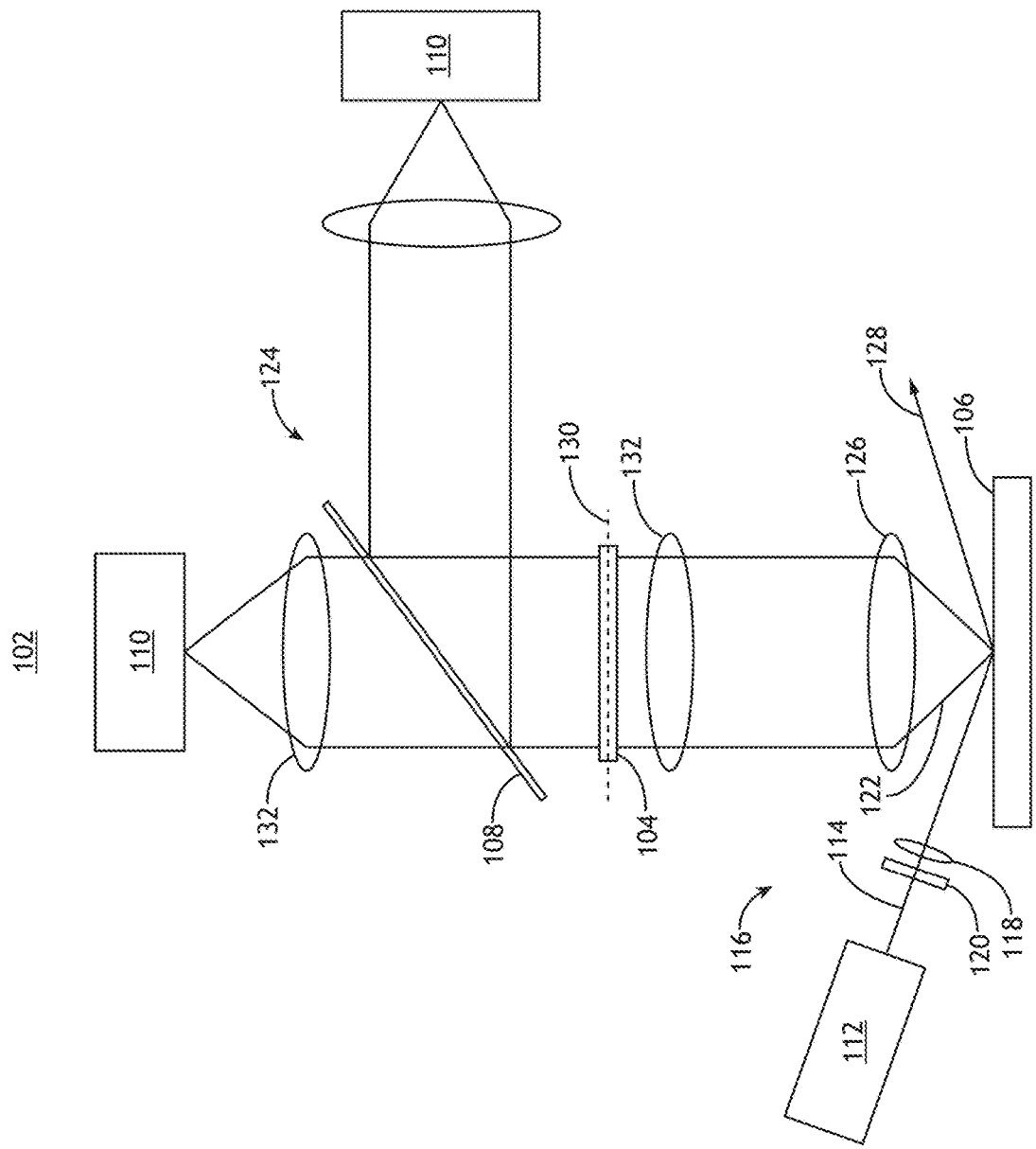
FIG. 1B is a conceptual view of the inspection tool, in accordance with one or more embodiments of the present disclosure.

FIG. 1B is a conceptual view of the inspection tool 102, in accordance with one or more embodiments of the present disclosure.

In some embodiments, the inspection tool 102 includes an illumination source 112 to generate an illumination beam 114 and an illumination pathway 116 including one or more illumination optics to direct the illumination beam 114 to a sample 106.

The illumination source 112 may include any type of light source known in the art. Further, the illumination source 112 may provide an illumination beam 114 having any selected spatial or temporal coherence characteristics. In some embodiments, the illumination source 112 includes one or more laser sources such as, but not limited to, one or more narrowband laser sources, one or more broadband laser sources, one or more supercontinuum laser sources, or one or more white light laser sources. In some embodiments, the illumination source 112 includes a laser-driven light source (LDLS) such as, but not limited to, a laser-sustained plasma (LSP) source. For example, the illumination source 112 may include, but is not limited to, a LSP lamp, a LSP bulb, or a LSP chamber suitable for containing one or more elements that, when excited by a laser source into a plasma state, may emit broadband illumination. In some embodiments, the illumination source 112 includes a lamp source such as, but not limited to, an arc lamp, a discharge lamp, or an electrode-less lamp.

The illumination beam 114 may include one or more selected wavelengths of light including, but not limited to, ultraviolet (UV) radiation, visible radiation, or infrared (IR) radiation. For example, the illumination source 112 may provide, but is not required to provide, an illumination beam 114 having wavelengths shorter than approximately 350 nm.

By way of another example, the illumination beam 114 may provide wavelengths of approximately 266 nm. By way of another example, the illumination beam 114 may provide wavelengths of approximately 213 nm. By way of another example, the illumination beam 114 may provide wavelengths of approximately 193 nm. It is recognized herein that imaging resolution and light scattering by small particles (e.g., relative to the wavelength of the illumination beam 114) both generally scale with wavelength such that decreasing the wavelength of the illumination beam 114 may generally increase the imaging resolution and scattering signal from the small particles. Accordingly, illumination beam 114 may include short-wavelength light including, but not limited to, extreme ultraviolet (EUV) light, deep ultraviolet (DUV) light, or vacuum ultraviolet (VUV) light.

In some embodiments, the illumination source 112 provides a tunable illumination beam 114. For example, the illumination source 112 may include a tunable source of illumination (e.g., one or more tunable lasers, and the like). By way of another example, the illumination source 112 may include a broadband illumination source coupled to any combination of fixed or tunable filters.

The illumination source 112 may further provide an illumination beam 114 having any temporal profile. For example, the illumination beam 114 may have a continuous temporal profile, a modulated temporal profile, a pulsed temporal profile, and the like.

It is recognized herein that the strength of surface haze may depend on multiple factors including, but not limited to incidence angle or polarization of the illumination beam 114. For example, the strength of surface haze may be relatively high for near-normal angles of incidence and may drop off for higher incidence angles. In some embodiments, the illumination pathway 116 may include one or more illumination optics such as, but not limited to, lenses 118, mirrors, and the like to direct the illumination beam 114 to the sample 106 at an oblique incidence angle to decrease the generation of surface haze. The oblique incidence angle may generally include any selected incidence angle. For example, the incidence angle may be, but is not required to be, greater than 60 degrees with respect to a surface normal.

In some embodiments, the illumination pathway 116 includes one or more illumination beam-conditioning components 120 suitable for modifying and/or conditioning the illumination beam 114. For example, the one or more illumination beam-conditioning components 120 may include, but are not limited to, one or more polarizers, one or more waveplates, one or more filters, one or more beamsplitters, one or more diffusers, one or more homogenizers, one or more apodizers, or one or more beam shapers. In some embodiments, the one or more illumination beam-conditioning components 120 include a polarizer or waveplate oriented to provide a p-polarized illumination beam 114 on the sample 106.

The illumination of the sample 106 with the illumination beam 114 may result in light emanating from the sample 106 (e.g., sample light 122) based on any combination of reflection, scattering, diffraction, or luminescence from the sample 106. In this way, the sample light 122 may include a combination of surface haze from the sample 106 (e.g., from a bare semiconductor wafer, or the like) and light scattered from any particles on the sample 106 (e.g., particle scattering).

In some embodiments, the inspection tool 102 includes a collection pathway 124 with an objective lens 126 to collect at least a portion of the sample light 122. The sample light 122 may include any type of light emanating from the sample 106 in response to the illumination beam 114 including, but not limited to, scattered light, reflected light, diffracted light, or luminescence.

In some embodiments, the inspection tool 102 is a dark-field imaging system to exclude specularly-reflected light 128. In this regard, the inspection tool 102 may image the sample 106 based primarily on scattered light. Dark-field imaging may further be implemented using any technique known in the art. In some embodiments, an orientation and/or a numerical aperture (NA) of the objective lens 126 may be selected to not collect specularly-reflected light. For example, as illustrated in FIG. 1B, the objective lens 126 is oriented approximately normal to the sample 106 and has an NA that does not include specularly-reflected light 128 associated with the illumination beam 114. Further, the objective lens 126 may have, but is not required to have, an NA of approximately 0.9 or greater. In some embodiments, the inspection tool 102 may include one or more components to block specularly-reflected light 128 from reaching the detector 110.

In some embodiments, the inspection tool 102 includes at least one detector 110 configured to capture at least a portion of the sample light 122 collected by the collection pathway 124. The detector 110 may include any type of optical detector known in the art suitable for measuring illumination received from the sample 106. For example, a detector 110 may include a multi-pixel detector suitable for capturing an image of the sample 106 such as, but not limited to, a charge-coupled device (CCD) detector, a complementary metal-oxide-semiconductor (CMOS) detector, a time-delayed integration (TDI) detector, a photomultiplier tube (PMT) array, an avalanche photodiode (APD) array, or the like. In some embodiments, a detector 110 includes a spectroscopic detector suitable for identifying wavelengths of the sample light 122.

In some embodiments, the collection pathway 124 includes the CDER 104 located at or near a pupil plane 130. In this way, the CDER 104 may manipulate the surface haze from the sample 106 (e.g., a portion of the sample light 122) to be linearly polarized and aligned along a haze orientation direction across the pupil plane 130.

In some embodiments, the linear polarizer 108 is located between the CDER 104 and a detector 110 to suppress the surface haze along the haze orientation direction along the path of at least one detector 110. The linear polarizer 108 may be formed as any type of polarizer known in the art. For example, the linear polarizer 108 may be formed as an absorbing polarizer that absorbs light along a rejection direction and passes remaining light either through transmission or reflection. In this configuration, the rejection direction may be aligned to the haze orientation direction such that the linear polarizer 108 may absorb the surface haze and pass the remaining light (e.g., portions of the sample light 122 associated with particle scattering). By way of another example, as illustrated in FIG. 1B, the linear polarizer 108 may be formed as a polarizing beamsplitter, which may split light with orthogonal polarizations along two separate optical paths. In this configuration, the linear polarizer 108 may direct the surface haze aligned along the haze orientation direction along a first optical path and direct the remining light along a second optical path. Further, as also illustrated in FIG. 1B, the inspection tool 102 may include a detector 110 and any associated optical elements (e.g., lenses, stops, filters, or the like) along each of the two optical paths. The inspection tool 102 may thus generate data associated with surface haze in addition to the remaining light, which may be useful for, but is not limited to, diagnostic or evaluation purposes.

The collection pathway 124 may further include any number of beam-conditioning elements to direct and/or modify the sample light 122 including, but not limited to, one or more lenses (e.g., lenses 132), one or more filters, one or more apertures, one or more polarizers, or one or more phase plates. In this regard, the inspection tool 102 may control and/or adjust selected aspects of the sample light 122 used to generate an image on the detector 110 including, but not limited to, the intensity, phase, and polarization of the sample light 122 as a function of scattering angle and/or position on the sample 106. For example, as will be discussed in greater detail below, the beam-conditioning elements may include, but are not limited to, the phase mask 202.

It is recognized herein that a limited number of components and/or components with a limited thickness may be placed at a particular pupil plane 130 or sufficiently near a particular pupil plane 130 to provide a desired effect. Accordingly, for the purposes of the present disclosure, reference to one or more elements at a pupil plane 130 may generally describe one or more elements at or sufficiently close to a pupil plane 130 to produce a desired effect. In some embodiments, though not shown, the collection pathway 124 may include additional lenses to generate one or more additional pupil planes 130 such that any number of elements including, but not limited to, elements associated with the CDER 104, a phase mask 202 (see, e.g., FIG. 2 below), or the linear polarizer 108 may be placed at or near a pupil plane 130.

Figure 2:
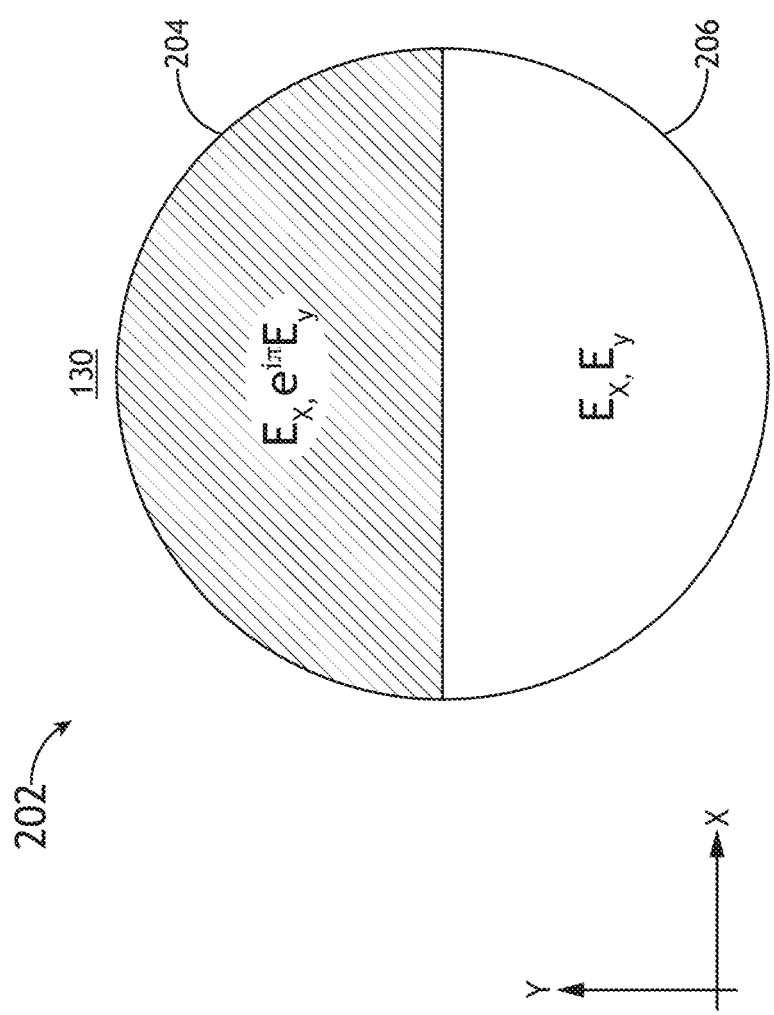
FIG. 2 is a conceptual top view of a phase mask including two segments to divide the pupil into two segments, in accordance with one or more embodiments of the present disclosure.

Referring now to FIG. 2, in some embodiments, the particle detection system 100 includes one or more components located at or near a pupil plane to reshape the point spread function (PSF) of p-polarized light scattered by sub-resolution particles. It is recognized herein that the image of a particle smaller than an imaging resolution of a system is generally limited by the system PSF, which is typically an Airy function when the image includes specularly-reflected light. However, the actual PSF associated with a particle (e.g., a particle PSF) and thus an actual image of the particle generated by a system is related to the particular electric field distribution of light from a particle in the pupil plane and may have a different size or shape than the system PSF, particularly when the image is formed from scattered light.

In particular, a dark-field image of a particle (e.g., an image of a particle formed with scattered or diffracted light) smaller than the imaging resolution when illuminated with oblique p-polarized light may be an annulus that spreads to an area larger than the system PSF, which negatively impacts particle detection sensitivity. This annulus shape and increase in the size of the PSF or imaged spot of a particle may be associated with destructive interference of collected light at a center of the imaged spot of a particle on the detector 110.

Accordingly, in some embodiments, the particle detection system 100 includes one or more components to modify the phase of sample light 122 across the pupil plane 130 to facilitate constructive interference of light at the center of an imaged spot of a particle on the detector 110 such as, but not limited to, one or more phase plates or one or more phase compensators.

For example, a phase mask may have various configurations suitable for reshaping the PSF of imaged particles. Phase masks for reshaping the PSF of imaged particles based on scattered light are generally described in U.S. Pat. No. 10,942,135 issued on Mar. 9, 2021, which is incorporated herein by reference in its entirety. In some embodiments, a phase mask may include one or more half-wave plates covering selected portions of the pupil plane 130. In this regard, the phase mask may be formed as a segmented optic where at least one of the segments includes a half-wave plate.

FIG. 2 is a conceptual top view of a phase mask 202 including two segments to divide the pupil into two segments (e.g., halves), in accordance with one or more embodiments of the present disclosure. For example, as illustrated in FIG. 2, the phase mask 202 may include a segment 204 formed from a half-wave plate with an optic axis along an X direction to introduce a phase shift of $\pi$ for light polarized along a Y direction with respect to orthogonal polarizations (represented as $E_x$, $e^{i\pi}E_y$). Further, the phase mask 202 may include a segment 206 that does not rotate the polarization of light. For example, the segment 206 may include a compensating plate formed from an optically homogenous material along the direction of propagation such that light through the segment 206 propagates along the same (or substantially the same) optical path length as light in segment 204. In one embodiment, the compensating plate is formed from a material having approximately the same thickness and index of refraction as a half-wave plate in segment 204, but without birefringence along the propagation direction. In another embodiment, the compensating plate is formed from the same material as the half-wave plate in segment 204, but cut along a different axis such that light propagating through the compensating plate does not experience birefringence. For instance, light propagating along the optic axis of a uniaxial crystal may not experience birefringence such that the crystal may be optically homogenous for light propagating along the optic axis. By way of another example, the segment 206 may include an aperture.

Further, in some embodiments, a phase mask 202 may be tilted out of the pupil plane to at least partially compensate for optical path length differences across the pupil plane 130.

A segmented phase mask 202 may be formed using any technique known in the art. In one embodiment, the various segments (e.g., segments 204-206 of FIG. 2) are formed as a single component in which the various segments are placed in a single plane.

It is to be understood, however, that FIG. 2 and the associated description are provided solely for illustrative purposes and should not be interpreted as limiting. For example, a phase mask 202 with two segments may include a half-wave plate placed in the bottom portion of the collection area 306 rather than the top portion as illustrated in in FIG. 4. Further, the phase mask 202 may include any number of segments formed from any combination of materials in any pattern across the pupil plane 130 so as to reshape the PSF of light scattered from a particle. For example, given a known electric field distribution of light in the pupil plane (e.g., measured, simulated, or the like) associated with an object of interest, a segmented phase mask 202 as described herein may be formed to selectively adjust the phase of various regions of light in the pupil plane to reshape the PSF of an image of the object of interest. In particular, the various segments of the phase mask 202 may be selected to facilitate constructive interference at a detector 110 to provide a tight PSF that approaches the system PSF (e.g., within a selected tolerance).

Figures 3A, 3B:
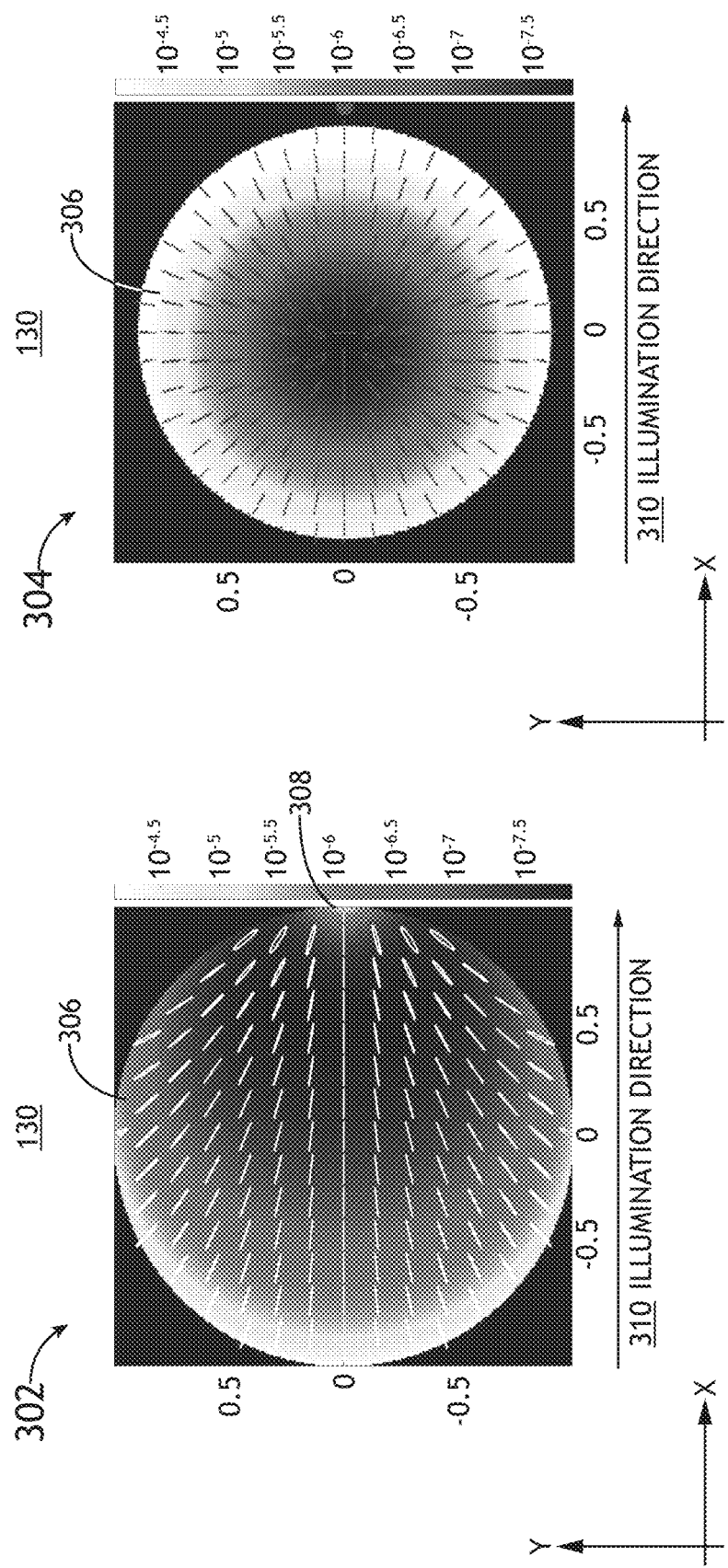
FIG. 3A is a pupil-plane scattering map of surface scattering in response to obliquely-incident p-polarized light, in accordance with one or more embodiments of the present disclosure.
FIG. 3B is a pupil-plane scattering map of light scattered by a small particle in response to obliquely-incident p-polarized light, in accordance with one or more embodiments of the present disclosure.

It is further recognized herein that the design of the phase mask 202 may represent a tradeoff between an "ideal" phase mask based on a known electric field distribution associated with particles of interest (e.g., as illustrated in FIG. 3B, or the like) and practical design and/or manufacturing considerations. For example, it may be the case that an ideal or otherwise desired phase mask 202 is unjustifiably expensive or difficult to manufacture. However, it may be the case that certain designs of the phase mask 202 may satisfy both manufacturing and performance specifications (e.g., a particle PSF having a selected shape, or the like). Accordingly, the designs of the phase mask 202 illustrated in FIG. 2 may represent a non-limiting example providing a particular tradeoff between performance and manufacturability.

In another embodiment, as will be described in greater detail below, the particle detection system 100 may include a phase compensator formed from an optical homogenous material having a spatially-varying thickness across the pupil plane to facilitate constructive interference of sample light 122 associated with particle scattering at a center of an image of the particle on the detector 110.

Referring now to FIGS. 3A-6D, the CDER 104 is described in greater detail, in accordance with one or more embodiments of the present disclosure. FIGS. 3A and 3B illustrate pupil-plane scattering maps corresponding to electric field distributions (e.g., polarization states) of sample light 122 associated with light scattered from a bare sample 106 (e.g., surface haze) and light scattered from a particle. FIGS. 4A-6D then illustrate various non-limiting configurations of the CDER 104 and associated evolution of the polarization states of the surface haze.

It is recognized herein that light scattered from the surface of a sample 106 (e.g., surface haze, surface scattering, or the like) may be considered noise in particle detection applications. Accordingly, it may be desirable to filter portions of the sample light 122 associated with surface haze from portions of the sample light 122 associated with light scattered by particles of interest.

FIG. 3A is a pupil-plane scattering map 302 of surface scattering (e.g., surface haze) in response to obliquely-incident p-polarized light, in accordance with one or more embodiments of the present disclosure. FIG. 3B is a pupil-plane scattering map 304 of light scattered by a small particle (e.g., small relative to an imaging resolution of the particle detection system 100 or a wavelength of the illumination beam 114) in response to obliquely-incident p-polarized light, in accordance with one or more embodiments of the present disclosure.

In particular, the scattering maps 302, 304 include the electric field strength indicated by the shading with white as the highest intensity and black as the lowest intensity. Further, the scattering maps 302, 304 include the polarization orientation of light as a function of collection angle (e.g., scattering angle) in the pupil plane 130 indicated by the overlaid ellipses. The scattering maps 302, 304 are bounded by a collection area 306 in the pupil plane, which is associated with the range of angles that sample light 122 is collected by the inspection tool 102. For example, the collection area 306 may correspond to the numerical aperture (NA) of an objective lens in the collection pathway 124.

The scattering maps 302, 304 are based on a configuration of the particle detection system 100 illustrated in FIGS. 1A and 1B. In FIGS. 3A and 3B, the specular reflection angle 308 is located outside of the collection area 306 along the illumination direction 310 (e.g., outside the collection area 306 on the right side of the circular collection area 306 in FIG. 3A), indicating that the inspection tool 102 does not capture specularly-reflected light. However, alternative configurations are within the scope of the present disclosure. For example, in the case that the specular reflection angle 308 lies within the pupil plane, the specularly-reflected light may be blocked prior to the detector 110 to generate a dark-field image.

Additionally, the scattering maps 302, 304 may be representative of scattering from a wide variety of materials including, but not limited to, silicon, epitaxial silicon, and poly-silicon wafers. However, it is to be understood that the scattering maps 302, 304 are provided solely for illustrative purposes and should not be interpreted as limiting the present disclosure.

As illustrated in FIGS. 3A and 3B, the electric field distribution (e.g., electric field strength and polarization orientation) of light scattered by a particle may differ substantially from the electric field distribution of light scattered by a surface, particularly when the illumination beam 114 is p-polarized. For example, sample light 122 associated with surface haze generally exhibits an approximately radial polarization distribution with respect to the specular reflection angle 308 in the collection area 306 as illustrated in FIG. 3A. In contrast, sample light 122 associated with particle scattering generally exhibits a radial polarization distribution with respect to the surface normal as illustrated in FIG. 3B. Further, the polarization of the scattered sample light 122 light is generally elliptical. As can be seen from FIGS. 3A and 3B, at most locations in the pupil plane 130, the ellipses are very elongated meaning that one linear polarization component is much stronger than the other. For the sample light 122 scattered from a small particle (e.g., FIG. 3B), the polarization may be more elliptical near the center of the pupil, meaning that the two linear polarization components can be roughly comparable in magnitude. However, the intensity of the light in this region of the pupil is relatively low and contribute little to the total scattering signal from a small particle.

FIG. 4A is a conceptual view of a first configuration of a collection pathway 124 of an inspection tool 102 including a CDER 104, in accordance with one or more embodiments of the present disclosure. It is contemplated herein that each of the components illustrated in FIG. 4A may be formed as a single optical element or may be distributed among any number of optical elements. In this way, adjacent components may be, but are not required to be, in physical contact. Further, the inspection tool 102 may include any number of pupil planes such that the components illustrated in FIG. 4A may be located at or near a single pupil plane or distributed between multiple pupil planes.

In some embodiments, the collection pathway 124 includes a CDER 104 formed from two polarization rotators 402 (e.g., optical rotators) on either side of a quarter-wave plate 404, followed by a linear polarizer 108. In this way, the CDER 104 may manipulate the surface haze to be linearly polarized along a selected haze orientation direction and the linear polarizer 108 may be oriented to reject light along this haze orientation direction and thus suppress the surface haze. In some embodiments, the collection pathway 124 further includes a phase mask 202 to reshape the PSF of light through the CDER 104 and the linear polarizer 108 to provide sharp imaging onto a detector 110 (not shown) of the inspection tool 102.

A polarization rotator 402 may include any combination of optical elements known in the art providing a spatially-varying amount of polarization rotation (e.g., a spatially-varying polarization rotation angle) across the pupil plane. In this way, a polarization rotator 402 may selectively rotate the polarization of light at any location in the pupil plane by any selected amount.

Further, the selected polarization direction for rejection of the surface haze (e.g., the haze orientation direction) may be any suitable direction. For example, the selected polarization direction may be chosen based on an expected distribution of particle-scattered sample light 122 (e.g., as illustrated in FIG. 3B) to minimize the intensity of rejected particle-scattered sample light 122.

Figure 4C:
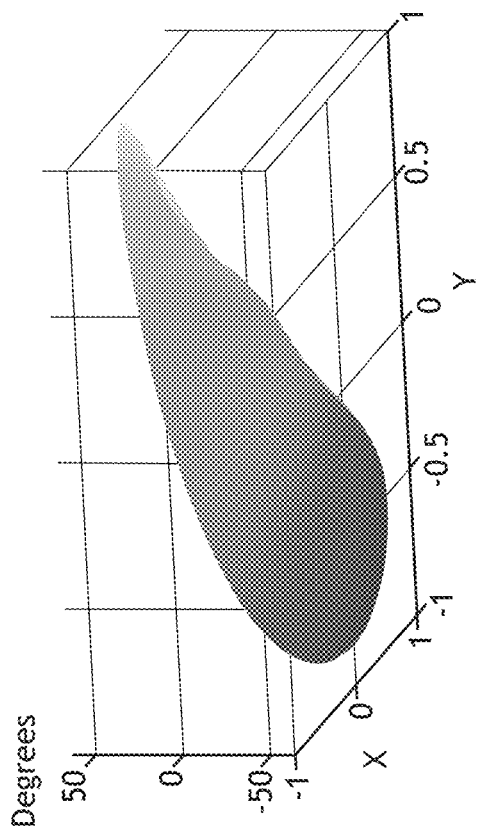
FIG. 4C is a plot illustrating the spatially-varying polarization rotation distribution of the first polarization rotator to generate the surface haze electric field distribution of FIG. 4B, in accordance with one or more embodiments of the present disclosure.

FIGS. 4B-4G illustrate the evolution of the electrical field distribution of surface haze by the components illustrated in FIG. 4A, in accordance with one or more embodiments of the present disclosure. In FIGS. 4B-4G, the greyscale intensity map corresponds to the intensity of the surface haze. Further, polarization states at selected locations across the pupil plane are illustrated as an overlay to illustrate the distribution of polarization states across the pupil plane.

In some embodiments, the first polarization rotator 402a provides a spatially-varying polarization rotation distribution to rotate the polarizations of surface haze (e.g., as illustrated in FIG. 3A) to a common haze orientation direction. The common direction may include any arbitrarily selected direction in the pupil plane. For instance, the haze orientation direction may be selected to correspond to a direction in the pupil plane that is different than polarization directions of particle scattering (e.g., as depicted in FIG. 3B) such that the surface haze may be distinguished from the particle scattering. In another instance, the haze orientation direction may be selected to correspond to a vertical direction (e.g., Y direction) or horizontal direction (e.g., X direction) in the orientation depicted in FIG. 4B (e.g., the haze orientation direction may be selected to be perpendicular or parallel to the plane of incidence of illumination beam 114 on sample 106).

Figure 4B:
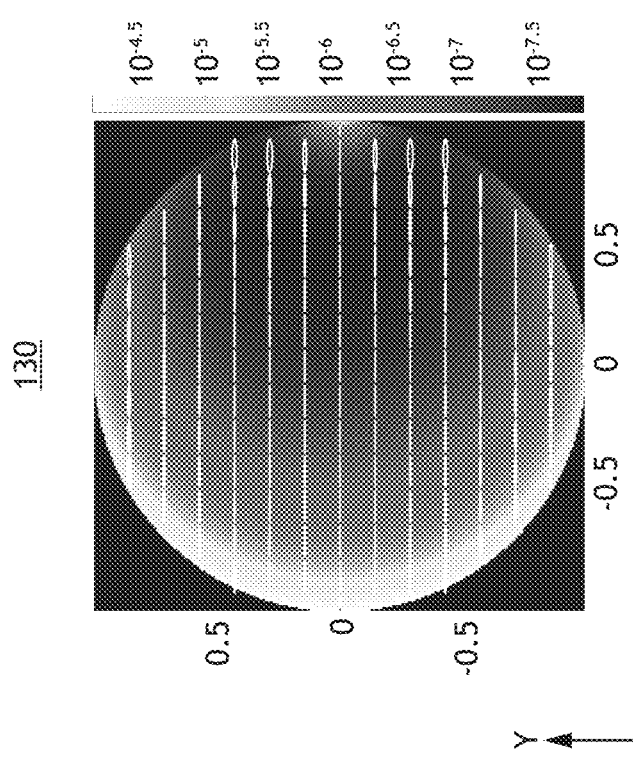
FIG. 4B is a plot of the surface haze electric field distribution illustrated in FIG. 3A after propagating through a first polarization rotator arranged to align the polarization ellipses of the surface haze along a direction of illumination, in accordance with one or more embodiments of the present disclosure.

FIG. 4B is a plot of the surface haze electric field distribution illustrated in FIG. 3A after propagating through a first polarization rotator 402a arranged to align the polarization ellipses of the surface haze (e.g., the long axes of the polarization ellipses) along a direction of illumination (e.g., the X direction), in accordance with one or more embodiments of the present disclosure. As illustrated in FIG. 4B, the shape of the polarization ellipses remain substantially unchanged as the polarization is rotated. FIG. 4C is a plot illustrating the spatially-varying polarization rotation distribution of the first polarization rotator 402a to generate the surface haze electric field distribution of FIG. 4B, in accordance with one or more embodiments of the present disclosure.

Figure 4D:
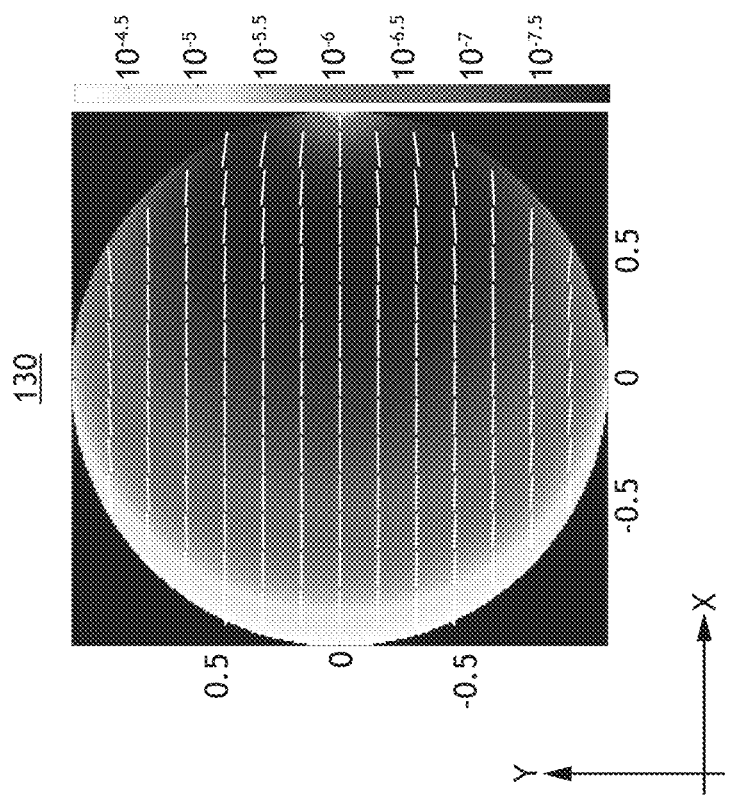
FIG. 4D is a plot of the surface haze electric field distribution illustrated in FIG. 4B after propagating through the quarter-wave plate, in accordance with one or more embodiments of the present disclosure.

In some embodiments, the quarter-wave plate 404 converts the elliptical polarizations across the pupil plane to linear polarizations. FIG. 4D is a plot of the surface haze electric field distribution illustrated in FIG. 4B after propagating through the quarter-wave plate 404, in accordance with one or more embodiments of the present disclosure. As illustrated in FIG. 4D, the resulting orientation of linearly-polarized light from the quarter-wave plate 404 depends on the eccentricity of the incident light. For example, the greater the eccentricity of the incident light, the greater the degree to which the light is rotated with respect to the haze orientation direction.

Figure 4F:
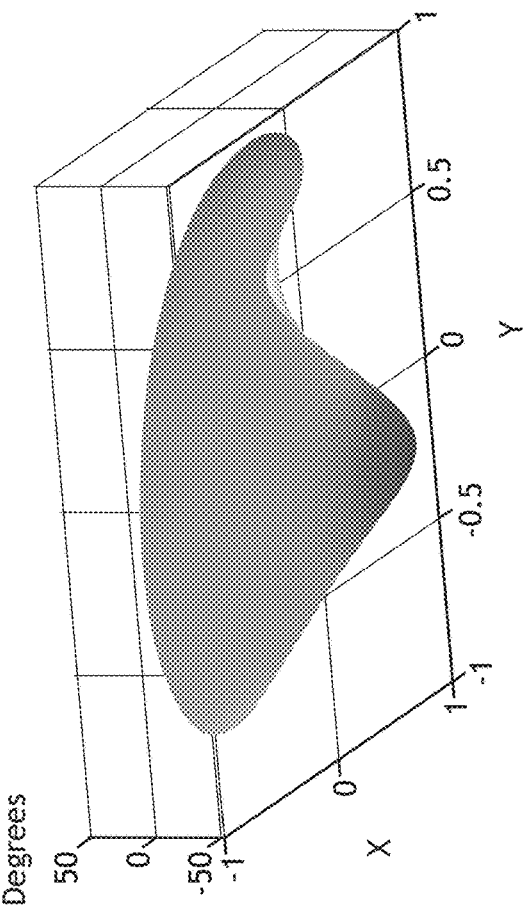
FIG. 4F is a plot illustrating the spatially-varying polarization rotation distribution of the second polarization rotator to generate the surface haze electric field distribution of FIG. 4E, in accordance with one or more embodiments of the present disclosure.
Figure 4E:
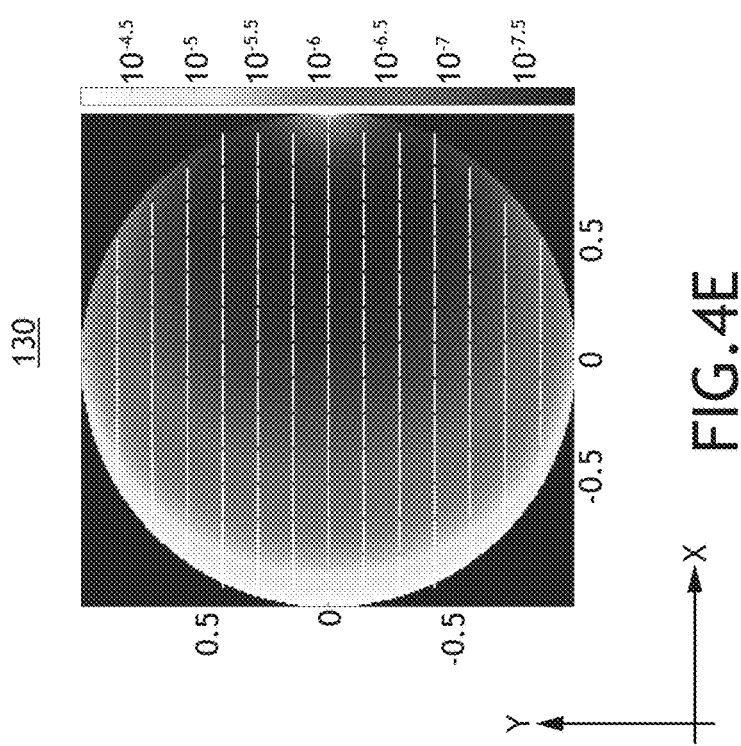
FIG. 4E is a plot of the surface haze electric field distribution illustrated in FIG. 4D after propagating through the second polarization rotator, in accordance with one or more embodiments of the present disclosure.

In some embodiments, the second polarization rotator 402b rotates the polarizations of surface haze back to a common haze orientation direction. FIG. 4E is a plot of the surface haze electric field distribution illustrated in FIG. 4D after propagating through the second polarization rotator 402b, in accordance with one or more embodiments of the present disclosure. In this way, the second polarization rotator 402b may compensate for or otherwise correct for any deviations of the polarization states from the haze orientation direction induced by the quarter-wave plate 404. For example, FIG. 4E illustrates surface haze that is linearly polarized across the pupil plane along the haze orientation direction (e.g., the X direction). However, it is to be understood that the second polarization rotator 402b may generally align the polarizations of the surface haze across the pupil plane to any arbitrarily selected haze orientation direction that does not necessarily need to be the same as the haze orientation direction provided by the first polarization rotator 402a. FIG. 4F is a plot illustrating the spatially-varying polarization rotation distribution of the second polarization rotator 402b to generate the surface haze electric field distribution of FIG. 4E, in accordance with one or more embodiments of the present disclosure.

Figure 4G:
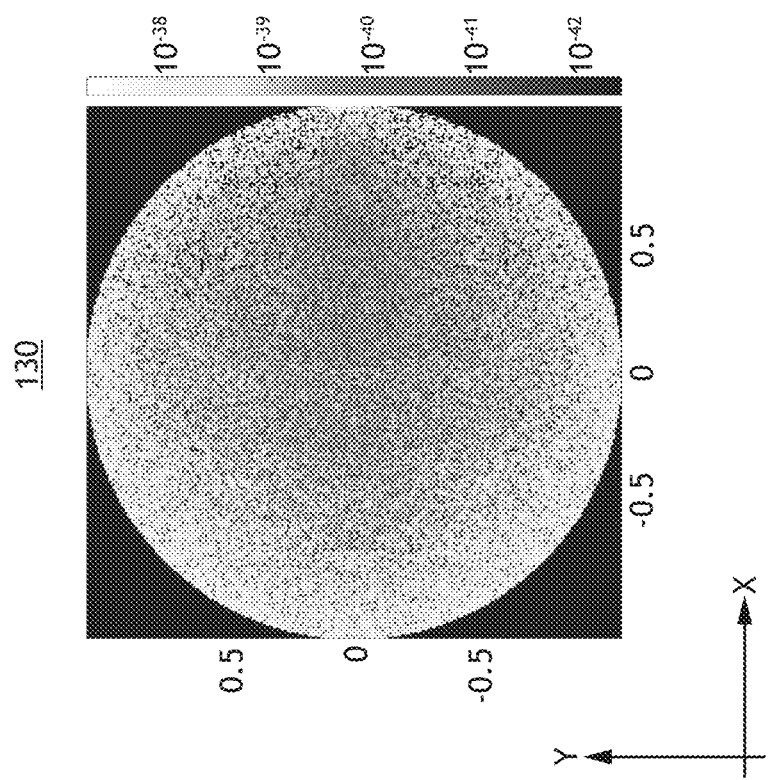
FIG. 4G is a plot of the surface haze electric field distribution illustrated in FIG. 4E after propagating through the linear polarizer, in accordance with one or more embodiments of the present disclosure.

FIG. 4G is a plot of the surface haze electric field distribution illustrated in FIG. 4E after propagating through the linear polarizer 108, in accordance with one or more embodiments of the present disclosure. As illustrated by the magnitude scale in FIG. 4G, the precise manipulation of the surface haze to linear polarization along a haze orientation direction facilitates highly sensitive suppression of the surface haze across the entire pupil plane.

Referring now to FIGS. 4H-4M, various implementations of the components illustrated in FIG. 4A are described in greater detail in accordance with one or more embodiments of the present disclosure. A polarization rotator 402 providing a spatially-varying amount of polarization rotation is generally described in U.S. Pat. No. 10,948,423 issued on Mar. 16, 2021, which is incorporated herein by reference in its entirety.

Figure 4I:
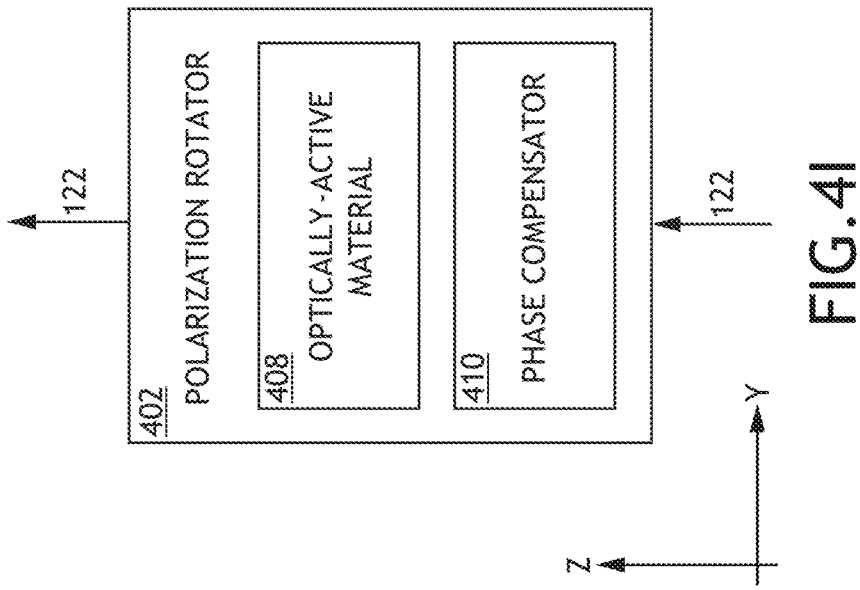
FIG. 4I is a block diagram view of the polarization rotator formed as a segmented half-wave plate, in accordance with one or more embodiments of the present disclosure.
Figure 4H:
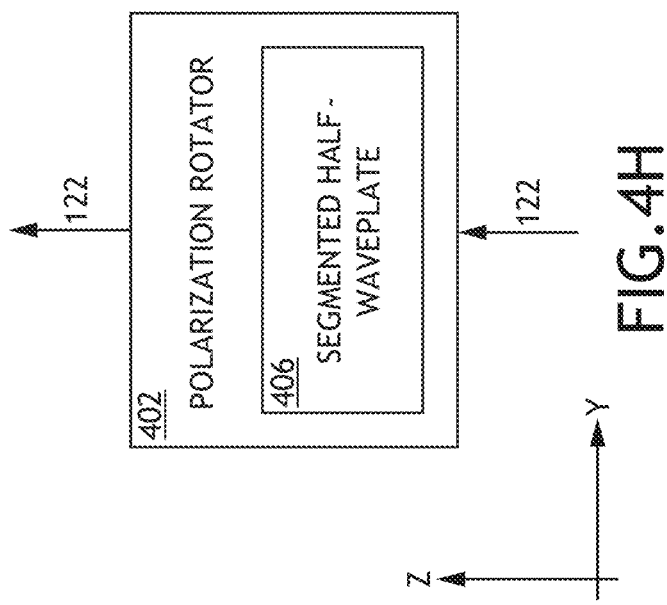
FIG. 4H is a block diagram view of the polarization rotator formed as a segmented half-wave plate 406, in accordance with one or more embodiments of the present disclosure.

In some embodiments, a polarization rotator 402 is formed from a segmented half-wave plate 406. FIG. 4H is a block diagram view of the polarization rotator 402 formed as a segmented half-wave plate 406, in accordance with one or more embodiments of the present disclosure. For example, a polarization rotator 402 may include two or more half-wave plates distributed across the pupil plane, each having an optic axis (e.g., a fast or a slow axis) oriented in a selected direction to provide a selected spatial distribution of polarization rotation angles. In this way, portions of the sample light 122 within different regions of the pupil plane may be rotated by different amounts. For instance, the orientation of the optic axis within each region of the pupil plane may be selected based on the polarization states of surface haze in each corresponding region of the pupil plane (e.g., as illustrated in FIG. 3A). Such polarization rotator 402 may generally include any number of half-wave plates (e.g., segments) in any distribution across the pupil plane to provide a selected spatially-varying distribution of polarization rotation. For instance, a polarization rotator 402 may include a linearly-segmented half-wave plate 406 having a series of half-wave plates distributed along a linear direction in the pupil plane (e.g., the Y-direction in FIG. 3A). In another instance, a polarization rotator 402 may include an angularly-segmented half-wave plate 406 having a series of wedge-shaped half-wave plates distributed radially around an apex location such as, but not limited to, a portion of the pupil plane corresponding to specular reflection of the illumination beam 114.

In some embodiments, a polarization rotator 402 includes an optically-active material 408 (e.g., a material exhibiting circular birefringence or circular dichroism, a chiral material, or the like) having a spatially-varying thickness to provide a selected spatial distribution of polarization rotation angles. FIG. 4I is a block diagram view of the polarization rotator 402 formed as a segmented half-wave plate 406, in accordance with one or more embodiments of the present disclosure.

It is recognized herein that polarization rotation using an optically-active material 408 may be based on a different mechanism than polarization rotation using a half-wave plate (e.g., a segmented half-wave plate). In particular, a half-wave plate may be formed by a material providing different refractive index values for orthogonal directions in the pupil plane (e.g., fast and slow axes) and a constant thickness set to intrude a phase delay of n (e.g., a half-wave) between light along these orthogonal directions. In this way, the amount of polarization rotation induced by the half-wave plate is controlled by a rotation of the half-wave plate in the pupil plane. In contrast, an optically-active material 408 may exhibit chirality and may provide a constant polarization rotation rate as a function of thickness. In this way, the amount of polarization rotation induced by the optically-active material 408 is controlled by the thickness of the optically-active material. It is further recognized herein that some materials such as, but not limited to, quartz may operate as a waveplate or an optically-active material 408 based on its orientation with respect to the pupil plane. For instance, quartz oriented with an optic axis in the pupil plane may operate as a waveplate, whereas quartz oriented with an optic axis orthogonal to the pupil plane (e.g., along a direction of propagation of the sample light 122) may operate as an optically-active material 408. It is to be understood, however, that this is merely an illustration and that an optically-active polarization rotator 402 may generally be formed from any optically-active material.

In some embodiments, a polarization rotator 402 formed from an optically-active material 408 may further include a phase compensator 410 to facilitate constructive interference of sample light 122 associated with particle scattering at a center of an image of the particle on the detector 110. For example, a phase compensator 410 may include an optical homogenous material having a spatially-varying thickness across the pupil plane 130 that is complementary to the spatially-varying thickness of the optically-active material 408. In this way, the total optical path of sample light 122 through the polarization rotator 402 may be constant across the pupil plane. By way of another example, phase compensator 410 may be formed from an optically active material that has the opposite handedness to the optically-active material 408 comprising the polarization rotator 402. In one instance, the optically-active material 408 includes right-handed quartz and the phase compensator 410 includes left-handed quartz, where each has a thickness profile selected such that the desired polarization rotations and phase corrections are achieved.

It is contemplated herein that a polarization rotator 402 formed from an optically-active material 408 may thus provide continuously-varying polarization rotation across the pupil plane by fabricating the polarization rotator 402 from an optically-active material 408 with a 2D continuous spatially-varying thickness. In some embodiments, the first polarization rotator 402a and/or the second polarization rotator 402b is formed from an optically-active material 408 with a 2D thickness profile providing precise polarization rotation across the pupil plane (e.g., according to the distributions illustrated in FIGS. 4C and 4F).

Figure 4J:
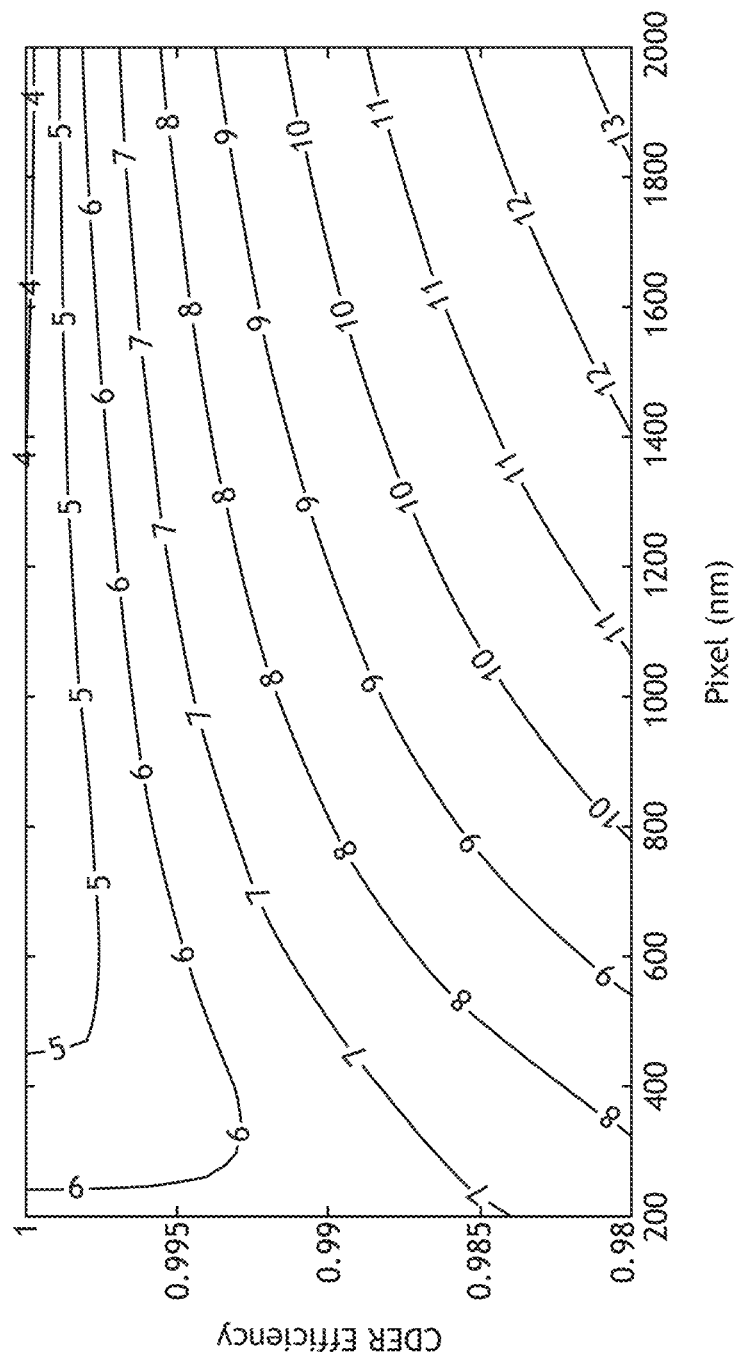
FIG. 4J corresponds to a simulation of the efficiency of a CDER as illustrated in FIG. 4A with polarization rotators formed from optically active materials with 2D thickness profiles, in accordance with one or more embodiments of the present disclosure.

FIG. 4J is a plot illustrating particle inspection sensitivity and efficiency of the CDER 104 at suppressing surface haze as a function of pixel size of a detector 110 in an inspection tool 102, in accordance with one or more embodiments of the present disclosure. It is contemplated herein that the particle detection sensitivity of an inspection tool 102 with a CDER 104 to suppress surface haze may depend on the particular electric field distributions of particles on the sample 106 relative to surface haze. For instance, the electric field distribution in 3B may correspond to a particular particle. In general, this distribution will vary based on various parameters such as, but not limited to, the particle size or composition.

For example, FIG. 4J corresponds to a simulation of the efficiency of a CDER 104 as illustrated in FIG. 4A with polarization rotators 402a,b formed from optically active materials 408 with 2D thickness profiles (e.g., as illustrated in FIGS. 4C and 4F), in accordance with one or more embodiments of the present disclosure. Further, the legends on the contours of FIG. 4J correspond to particle size in nanometers. As illustrated in FIG. 4J, this non-limiting illustration of a CDER 104 provides high efficiency (e.g., suppression of surface haze relative to light scattered by a particle) for a wide range of pixel sizes.

However, it is contemplated herein that in some cases it may be impractical or undesirable to manufacture an optically-active material 408 with a spatially-varying thickness profile that precisely provides a spatially-varying distribution of polarization rotations suitable for a particular step (e.g., the distributions illustrated in FIGS. 4C and 4F). Accordingly, in some embodiments, a particular polarization rotator 402 (e.g., the first polarization rotator 402a or the second polarization rotator 402b) may provide a spatial polarization rotation distribution that approximates an ideal polarization rotation distribution within a selected tolerance. In this way, performance and manufacturability may be balanced.

In some embodiments, a polarization rotator 402 (e.g., the first polarization rotator 402a, the second polarization rotator 402b, or the like) has an optically-active material 408 with a thickness profiles that varies along a single direction (e.g., a 1D thickness profile) to provide a 1D polarization rotation distribution. It is contemplated herein that it may be easier and/or more cost-effective to fabricate an optically-active material 408 with a 1D thickness profile than a 2D thickness profile. Further, as illustrated in FIG. 3A, the polarization ellipses of the surface haze vary strongly along the Y direction and relatively weakly along the X direction. Accordingly, 1D polarization rotation distribution that varies along the Y direction may reasonably approximate an ideal polarization rotation distribution.

Figure 4K:
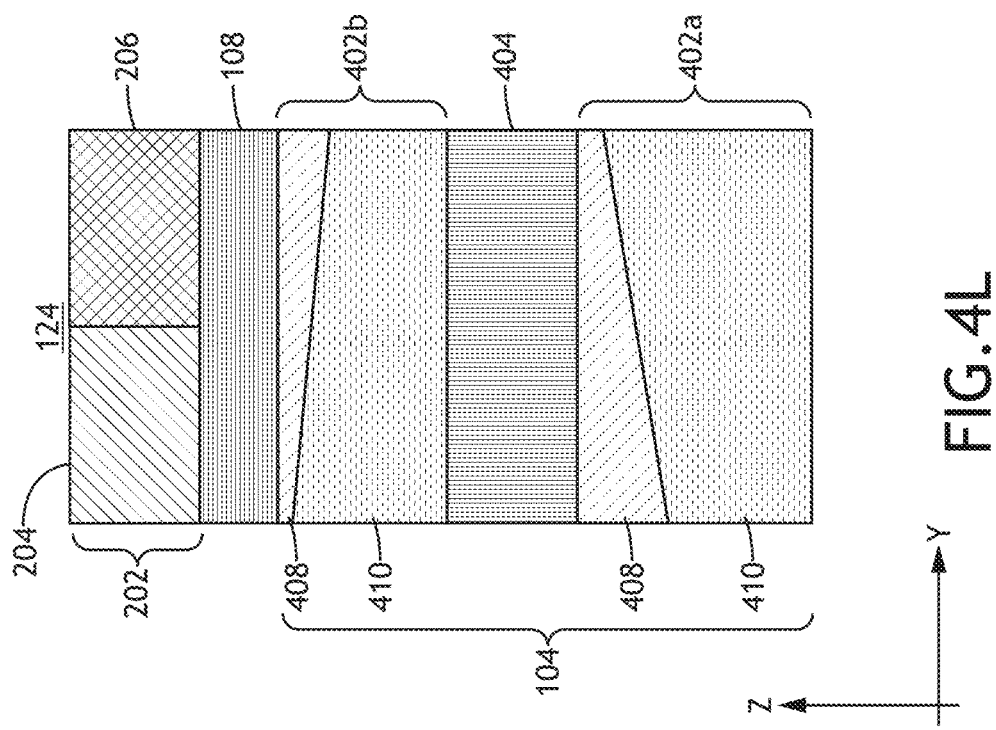
FIG. 4K is a conceptual cross-section view of the components illustrated in FIG. 4A in which the polarization rotators have thickness profiles that vary continuously along a single direction to provide a one-dimensionally-varying polarization rotation distribution, in accordance with one or more embodiments of the present disclosure.
Figure 4L:
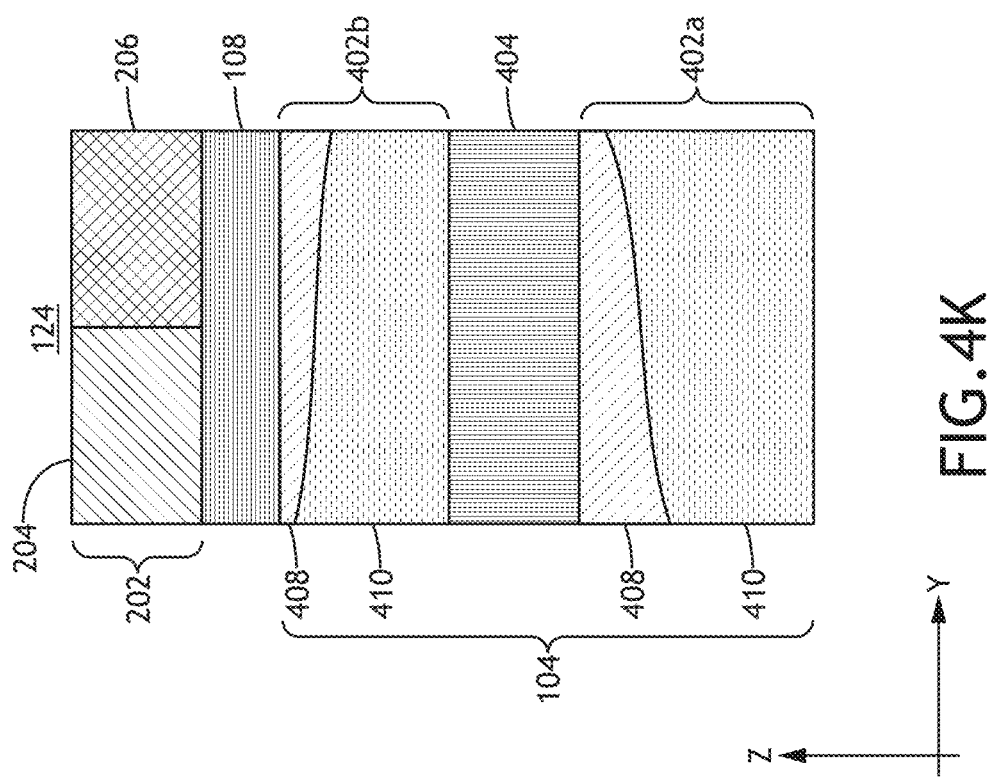
FIG. 4L is a conceptual cross-section view of the components illustrated in FIG. 4A in which the polarization rotators have thickness profiles that vary linearly along a single direction to provide a linearly-varying polarization rotation distribution, in accordance with one or more embodiments of the present disclosure.

FIG. 4K is a conceptual cross-section view of the components illustrated in FIG. 4A in which the polarization rotators 402a,b have thickness profiles that vary continuously along a single direction (e.g., the Y direction) to provide a one-dimensionally-varying polarization rotation distribution, in accordance with one or more embodiments of the present disclosure. FIG. 4L is a conceptual cross-section view of the components illustrated in FIG. 4A in which the polarization rotators 402a,b have thickness profiles that vary linearly along a single direction (e.g., the Y direction) to provide a linearly-varying polarization rotation distribution, in accordance with one or more embodiments of the present disclosure.

In some embodiments, a polarization rotator 402 (e.g., the first polarization rotator 402a and/or the second polarization rotator 402b) may be formed as a stack of components, where the desired properties (e.g., a spatial polarization rotation distribution) are achieved through propagation of light through the stack. For example, it may be impractical (e.g., based on cost, manufacturability, or the like) to directly fabricate an optically-active material 408 (or corresponding phase compensators 410) with a desired complex spatially-varying thickness profile (e.g., in 1D or 2D). However, it may be possible to construct a spatially-varying thickness profile (e.g., in 1D or 2D), or an approximation thereof, from a series of optically active materials 408 with profiles that are relatively easier to manufacture (e.g., spherical surfaces, linear surfaces, or the like), where the combination forms the desired complex spatially-varying thickness profile or a reasonable approximation thereof.

Figure 4M:
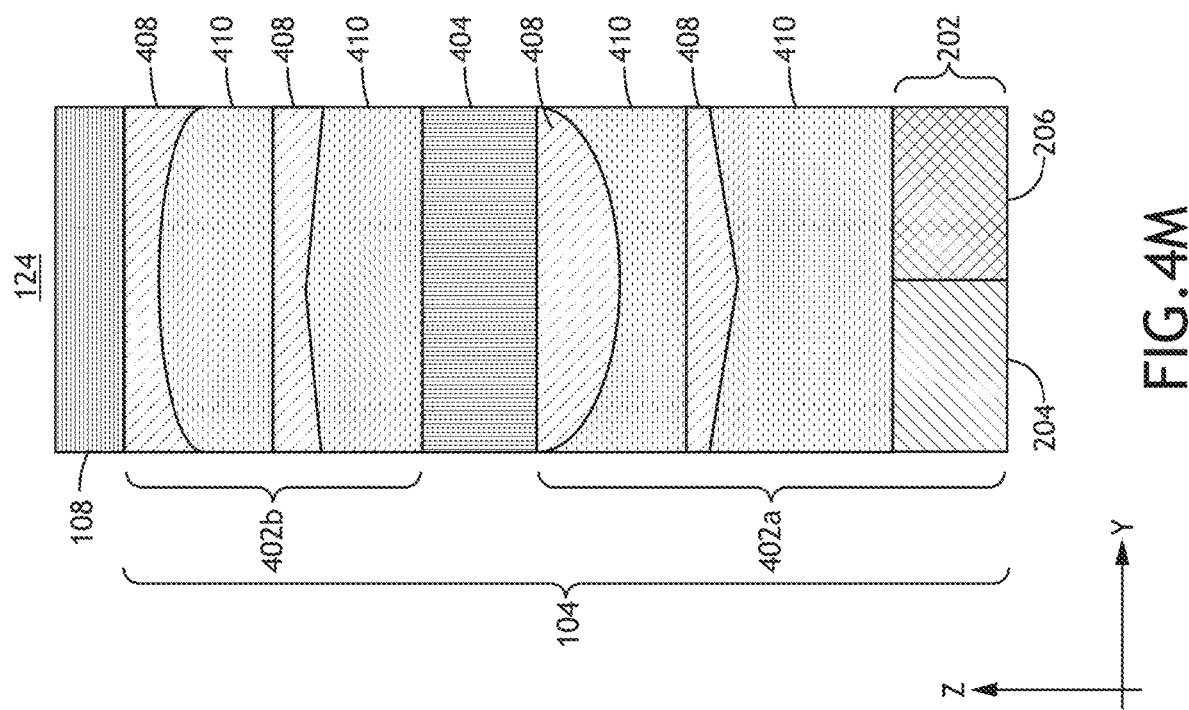
FIG. 4M is a conceptual cross-section view of the components illustrated in FIG. 4A in which the polarization rotators are formed as a stack of elements including two optically active materials and corresponding phase compensators, in accordance with one or more embodiments of the present disclosure.

FIG. 4M is a conceptual cross-section view of the components illustrated in FIG. 4A in which the polarization rotators 402a,b are formed as a stack of elements including two optically active materials 408 and corresponding phase compensators 410, in accordance with one or more embodiments of the present disclosure. For example, the optically active materials 408 and the corresponding phase compensators 410 in FIG. 4M are formed with spherical and linear profiles.

It is further contemplated herein that the phase mask 202 or other beam-conditioning elements may be integrated into the CDER 104. FIG. 4M further illustrates the phase mask 202 integrated with the first polarization rotator 402a. [ono] Referring now to FIGS. 5A-5F, it is contemplated herein that the functional steps of converting the elliptical polarizations of surface haze across the pupil plane to linear polarizations and aligning the linear polarizations along a common haze orientation direction for suppression and/or isolation by a subsequent linear polarizer 108 may be performed using a variety of techniques.

Figure 5A:
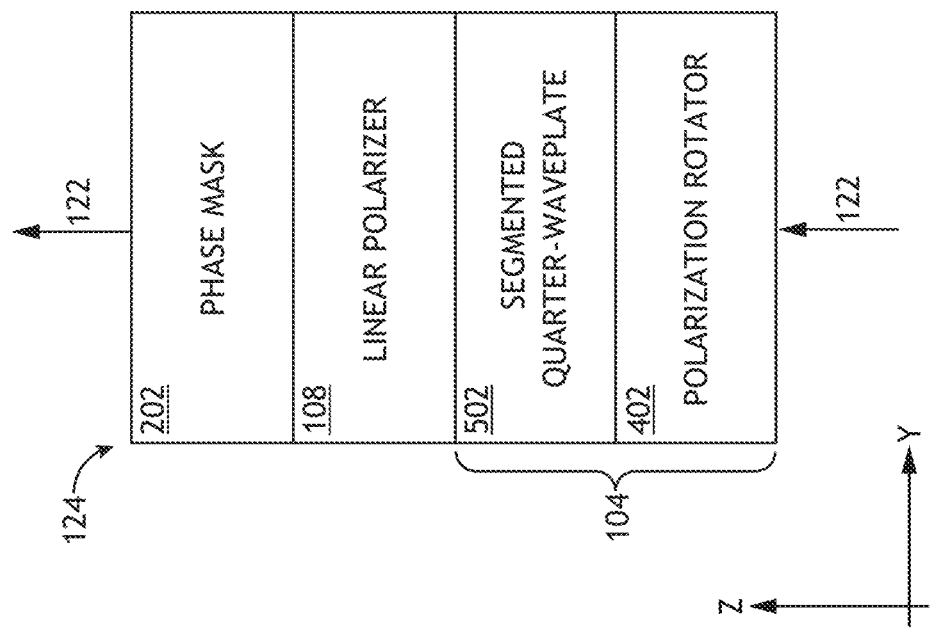
FIG. 5A is a conceptual view of a second configuration of a collection pathway of an inspection tool including a CDER, in accordance with one or more embodiments of the present disclosure.

FIG. 5A is a conceptual view of a second configuration of a collection pathway 124 of an inspection tool 102 including a CDER 104, in accordance with one or more embodiments of the present disclosure. As described with respect to FIG. 4A, each of the components illustrated in FIG. 5A may be formed as a single optical element or may be distributed among any number of optical elements in any number of pupil planes.

Figure 5C:
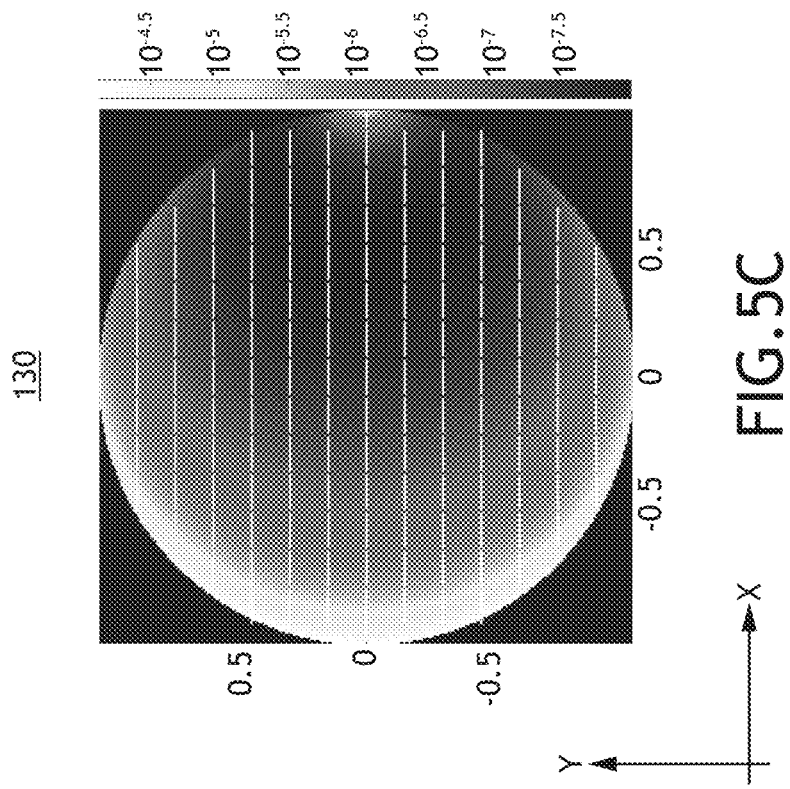
FIG. 5C is a plot of the surface haze electric field distribution illustrated in FIG. 5B after propagating through the quarter-wave plate in FIG. 5A, in accordance with one or more embodiments of the present disclosure.
Figure 5B:
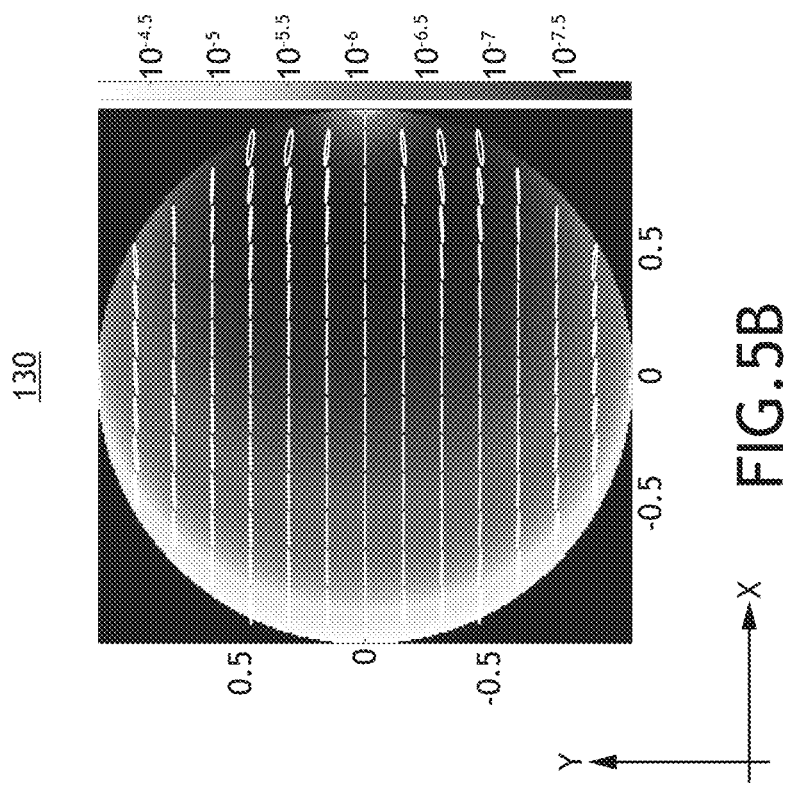
FIG. 5B is a plot of the surface haze electric field distribution illustrated in FIG. 3A after propagating through the polarization rotator in FIG. 5A, in accordance with one or more embodiments of the present disclosure.

In particular, FIG. 5A illustrates a configuration of a CDER 104 including a single polarization rotator 402 and a segmented quarter-wave plate 502, where both the polarization rotator 402 and the segmented quarter-wave plate 502 have spatially-varying operation across the pupil plane. It is contemplated herein that the impact of a segmented quarter-wave plate 502 on the orientation of linearly-polarized light may be accounted for when designing the polarization rotator 402 such that only a single polarization rotation step is needed. In this configuration, the polarization rotator 402 does not align the long axes of the elliptical polarizations as illustrated in FIG. 4B. Rather, the polarization rotator 402 provides a spatially-varying polarization rotation profile that is based at least in part on the eccentricity of the surface haze such that the polarizations of the surface haze across the pupil plane is aligned only after propagating through the segmented quarter-wave plate 502 and transformed to linear polarizations. For example, the polarization rotator 402 may align the elliptical polarizations such that the diagonals of the polarization ellipses are aligned along a common direction (e.g., the illumination direction or the horizontal direction as depicted in FIG. 5B below). A segmented quarter-wave plate 502 having optic axes oriented parallel to the short axis of each polarization ellipse may then both convert the elliptical polarizations to linear polarizations and provide that the linear polarizations are aligned along a common haze orientation direction (e.g., the illumination direction or the X direction as depicted in FIG. 5C below).

Figure 5D:
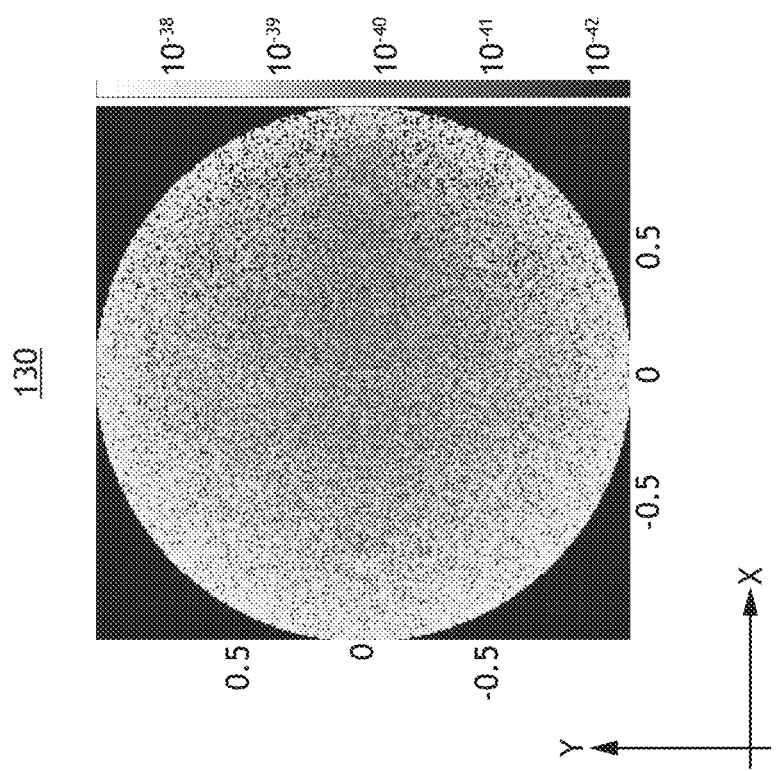
FIG. 5D is a plot of the surface haze electric field distribution illustrated in FIG. 5C after propagating through the linear polarizer in FIG. 5A, in accordance with one or more embodiments of the present disclosure.

FIG. 5B is a plot of the surface haze electric field distribution illustrated in FIG. 3A after propagating through the polarization rotator 402 in FIG. 5A, in accordance with one or more embodiments of the present disclosure. As illustrated in FIG. 5B, the long-axes of the polarization ellipses of the surface haze are not aligned parallel to one another but differ based on the eccentricity such that the diagonals of the ellipses are parallel to one another. FIG. 5C is a plot of the surface haze electric field distribution illustrated in FIG. 5B after propagating through the segmented quarter-wave plate 502 in FIG. 5A, in accordance with one or more embodiments of the present disclosure. FIG. 5D is a plot of the surface haze electric field distribution illustrated in FIG. 5C after propagating through the linear polarizer 108 in FIG. 5A, in accordance with one or more embodiments of the present disclosure. As depicted in FIG. 5D, the intensities are very low, as most of the surface haze is attenuated or diverted by the linear polarizer 108.

Figure 5F:
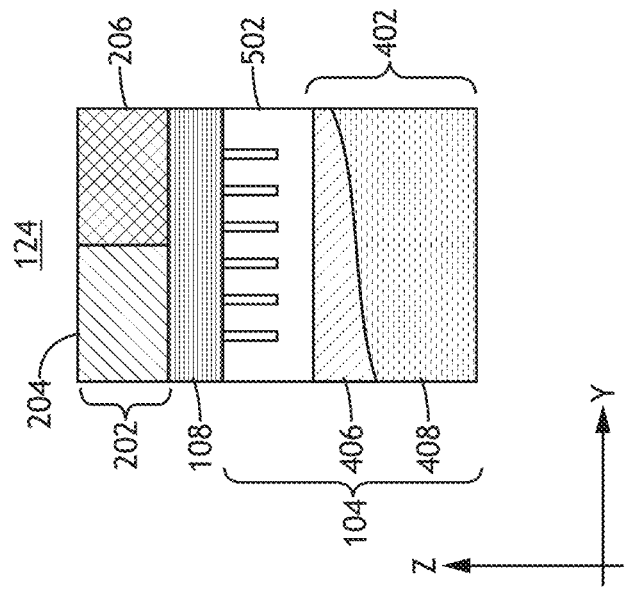
FIG. 5F is a conceptual cross-section view of the components illustrated in FIG. 5A in which the polarization rotator is formed as a continuous element and the quarter-wave plate is formed as a segmented quarter-wave plate, in accordance with one or more embodiments of the present disclosure.
Figure 5E:
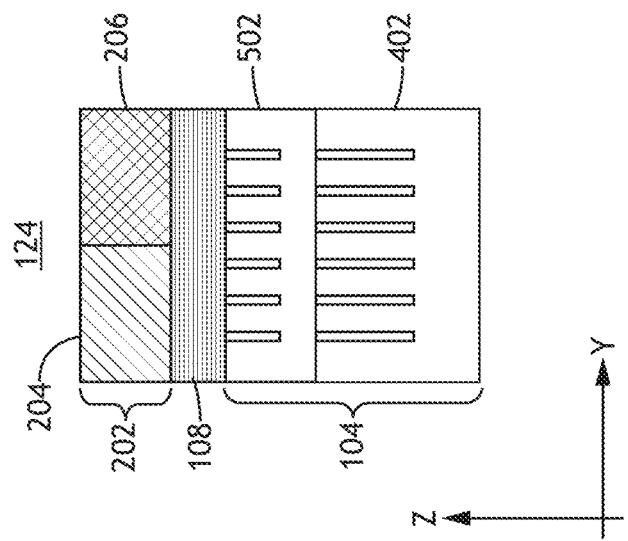
FIG. 5E is a conceptual cross-section view of the components illustrated in FIG. 5A in which the polarization rotator is formed as a segmented half-wave plate and the quarter-wave plate is formed as a segmented quarter-wave plate, in accordance with one or more embodiments of the present disclosure.

As described with respect to FIG. 4A, the polarization rotator 402 and the segmented quarter-wave plate 502 in FIG. 5A may be formed using any technique known in the art. FIG. 5E is a conceptual cross-section view of the components illustrated in FIG. 5A in which the polarization rotator 402 is formed as a segmented half-wave plate (e.g., with segments distributed along the horizontal direction of the pupil plane 130 as depicted in FIGS. 5B, 5C, and 5D) and the segmented quarter-wave plate 502 is formed with segments distributed along the horizontal direction here (e.g., the X direction), in accordance with one or more embodiments of the present disclosure. FIG. 5F is a conceptual cross-section view of the components illustrated in FIG. 5A in which the polarization rotator 402 is formed as a continuous element (e.g., an optically-active material 408 with a continuously-varying thickness profile) and the segmented quarter-wave plate 502 is formed with segments distributed along the illumination direction (e.g., the horizontal direction of the pupil plane as depicted in FIGS. 5B, 5C, and 5D), in accordance with one or more embodiments of the present disclosure.

Figure 6A:
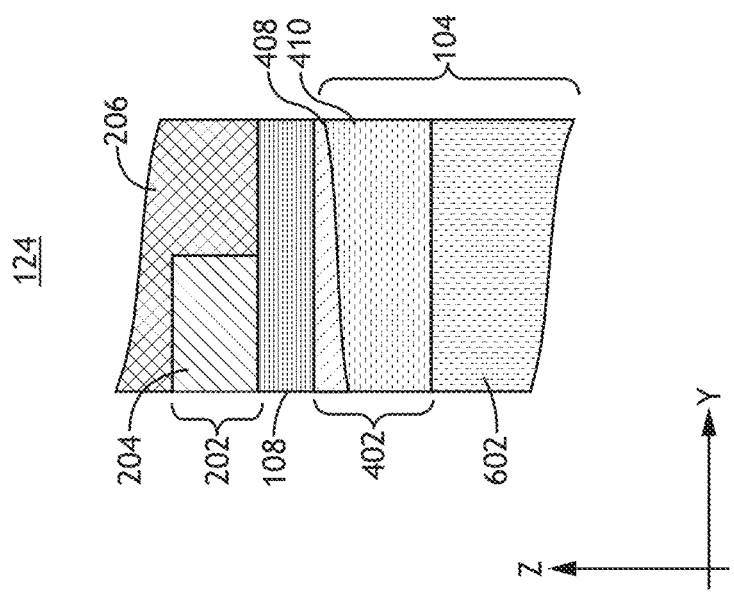
FIG. 6A is a conceptual cross-section view of a third configuration of a collection pathway of an inspection tool including a CDER, in accordance with one or more embodiments of the present disclosure.

FIG. 6A is a conceptual cross-section view of a third configuration of a collection pathway 124 of an inspection tool 102 including a CDER 104, in accordance with one or more embodiments of the present disclosure. As described with respect to FIGS. 4A and 5A, each of the components illustrated in FIG. 6A may be formed as a single optical element or may be distributed among any number of optical elements in any number of pupil planes.

In particular, FIG. 6A illustrates a configuration of a CDER 104 including a spatially-varying waveplate 602 to convert the polarization ellipses of the surface haze to a linear polarization across the pupil such that the linear polarizations are aligned along a common haze orientation direction. The CDER 104 may further include a polarization rotator 402 to rotate the linear polarizations of the surface haze to a common haze orientation direction. The polarization rotator 402 may have any suitable design such as, but not limited to, designs illustrated in FIGS. 4H and 4I. In some embodiments, the polarization rotator 402 includes an optically-active material 408 and optionally a phase compensator 410. In some embodiments, the polarization rotator 402 includes a segmented half-wave plate 406. For example, FIG. 6A illustrates a non-limiting configuration of the CDER 104 in which the polarization rotator 402 includes an optically-active material 408 and a phase compensator 410. FIG. 6A further illustrates a linear polarizer 108 and a phase mask 202 in the collection pathway 124 as described previously herein to isolate or suppress the surface haze and reshape the PSF of light through the CDER 104 (e.g., associated with sample light 122 of interest from particles on the sample 106).

In some embodiments, one or more components of the CDER 104 have a spatially-varying thickness to compensate (at least within a selected tolerance) for the spatial variation in thickness of the spatially-varying waveplate 602. For example, FIG. 6A illustrates a non-limiting configuration in which the CDER 104 includes a phase mask 202 with a segment 204 formed from a half-wave plate with an optic axis along the X direction to introduce a phase shift of $\pi$ for light polarized along a Y direction (e.g., as described above in reference to FIG. 2) and a segment 206 including a compensating plate formed from an optically homogenous material along the direction of propagation such that all light propagating through collection pathway 124 propagates along the same optical path length (e.g., at least within a selected tolerance). In particular, FIG. 6A illustrates the segment 206 having a spatially-varying thickness with a thickness profile designed to compensate for the spatially-varying thickness profile of the spatially-varying waveplate 602. By way of another example, the CDER 104 may include an additional compensating element formed from an optical homogenous material with a thickness profile designed to compensate for the spatially-varying thickness profile of the spatially-varying waveplate 602.

This spatially-varying waveplate 602 may be formed as a continuously-varying waveplate or a segmented waveplate as a birefringent material where the thickness and orientation of the optic axes are varied (e.g., continually or between segments) to provide both conversion of the elliptical polarizations of the surface haze to linear polarizations.

Figure 6C:
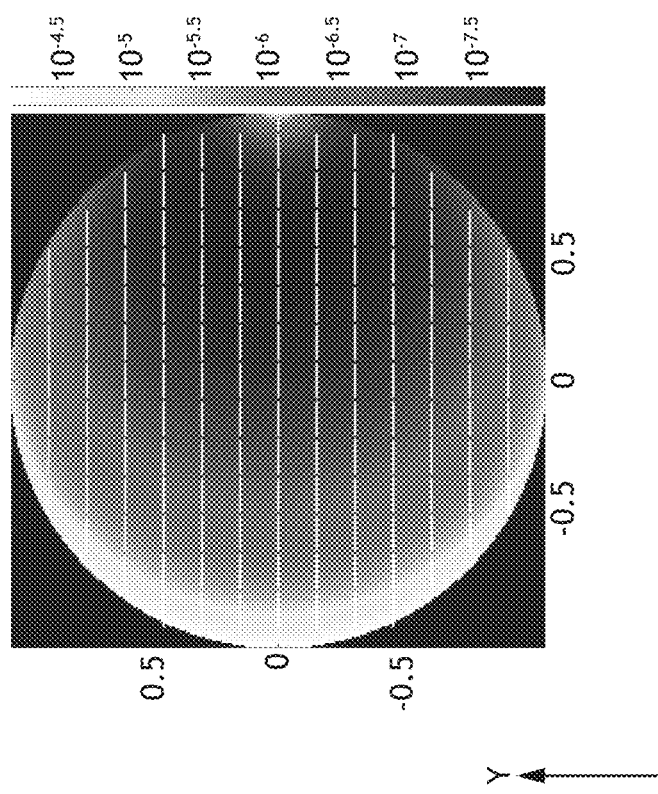
FIG. 6C is a plot of the surface haze electric field distribution illustrated in FIG. 6B after propagating through the optical rotator in FIG. 6A, in accordance with one or more embodiments of the present disclosure.
Figure 6B:
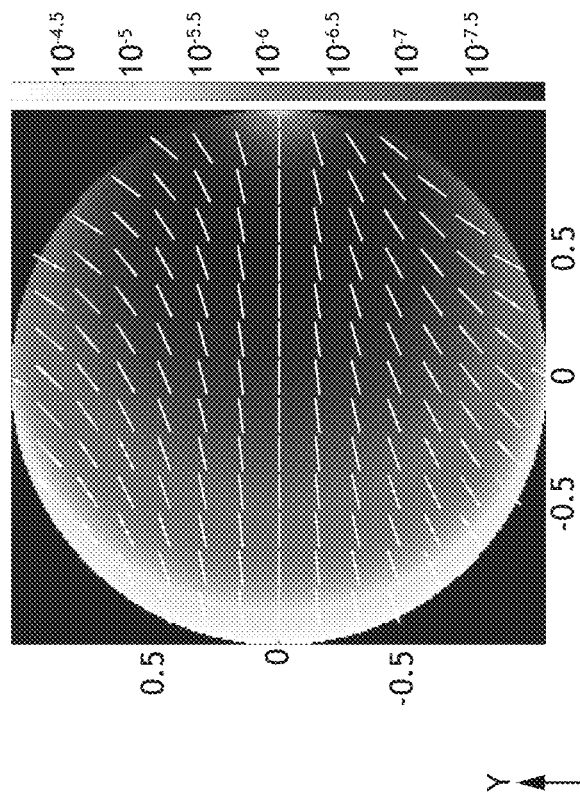
FIG. 6B is a plot of the surface haze electric field distribution illustrated in FIG. 3A after propagating through the spatially-varying waveplate in FIG. 6A, in accordance with one or more embodiments of the present disclosure.
Figure 6D:
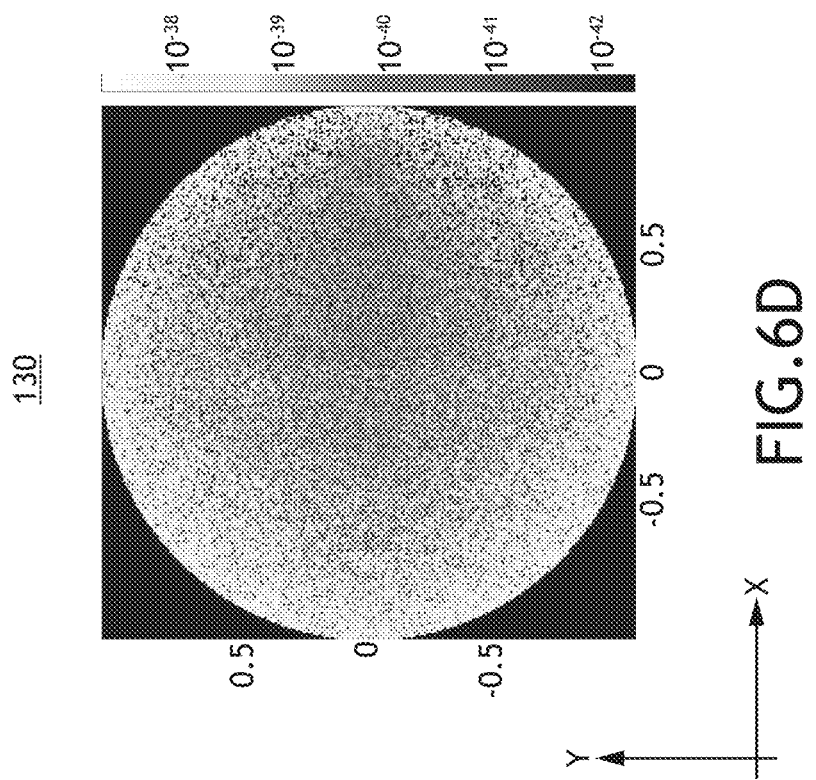
FIG. 6D is a plot of the surface haze electric field distribution illustrated in FIG. 6C after propagating through the linear polarizer in FIG. 6A, in accordance with one or more embodiments of the present disclosure.

FIG. 6B is a plot of the surface haze electric field distribution illustrated in FIG. 3A after propagating through the spatially-varying waveplate 602 in FIG. 6A, in accordance with one or more embodiments of the present disclosure. As illustrated in FIG. 6B, the elliptical polarizations in FIG. 3A are converted to linear polarizations with varying orientations across the pupil plane. FIG. 6C is a plot of the surface haze electric field distribution illustrated in FIG. 6B after propagating through the optical rotator 402 in FIG. 6A, in accordance with one or more embodiments of the present disclosure. In FIG. 6C, the orientations of the linearly-polarized light are oriented along a common haze orientation direction (e.g., the horizontal direction in FIG. 6C). FIG. 6D is a plot of the surface haze electric field distribution illustrated in FIG. 6C after propagating through the linear polarizer 108 in FIG. 6A, in accordance with one or more embodiments of the present disclosure. As depicted in FIG. 6D, the intensities are very low, as most of the surface haze is attenuated or diverted by the linear polarizer 108.

Referring now generally to FIGS. 4A-6D, it is noted that substantially similar performance may be achieved by the different designs illustrated in FIGS. 4A, 5A, and 6A. In particular, FIGS. 4E, 5C, and 6C illustrate both conversion of elliptically-polarized surface haze to linear polarizations and alignment of the surface haze along a haze orientation direction (here, horizontal directions in the respective figures). Similarly, FIGS. 4G, 5D, and 6D illustrate substantively similar suppression of the surface haze by a linear polarizer. Accordingly, it is to be understood that the teachings associated with the performance of the CDER 104 based on FIG. 4J may apply or be extended to all variations of the CDER 104 including, but not limited to, the variations illustrated in FIGS. 5A and 6A.

It is further to be understood that the FIGS. 4A-6D and the associated descriptions are provided solely for illustrative purposes and should not be interpreted as limiting. In particular, FIGS. 4A-6C represent non-limiting examples of the CDER 104.

Referring again to FIG. 1A, various additional components of the particle detection system 100 are described in greater detail, in accordance with one or more embodiments of the present disclosure.

In some embodiments, the particle detection system 100 includes a controller 134 including one or more processors 136 configured to execute program instructions maintained on a memory medium 138 (e.g., memory). Further, the controller 134 may be communicatively coupled to any components of the particle detection system 100. In this regard, the one or more processors 136 of controller 134 may execute any of the various process steps described throughout the present disclosure. For example, the controller 134 may receive, analyze, and/or process data from the detector 110 (e.g., associated with an image of the sample 106). By way of another example, the controller 134 may control or otherwise direct any components of the particle detection system 100 using control signals.

The one or more processors 136 of a controller 134 may include any processing element known in the art. In this sense, the one or more processors 136 may include any microprocessor-type device configured to execute algorithms and/or instructions. In some embodiments, the one or more processors 136 may consist of a desktop computer, mainframe computer system, workstation, image computer, parallel processor, or any other computer system (e.g., networked computer) configured to execute a program configured to operate the particle detection system 100, as described throughout the present disclosure. It is further recognized that the term "processor" may be broadly defined to encompass any device having one or more processing elements, which execute program instructions from a non-transitory memory medium 138. Further, the steps described throughout the present disclosure may be carried out by a single controller 134 or, alternatively, multiple controllers. Additionally, the controller 134 may include one or more controllers housed in a common housing or within multiple housings. In this way, any controller or combination of controllers may be separately packaged as a module suitable for integration into particle detection system 100.

The memory medium 138 may include any storage medium known in the art suitable for storing program instructions executable by the associated one or more processors 136. For example, the memory medium 138 may include a non-transitory memory medium. By way of another example, the memory medium 138 may include, but is not limited to, a read-only memory (ROM), a random-access memory (RAM), a magnetic or optical memory device (e.g., disk), a magnetic tape, a solid-state drive, and the like. It is further noted that memory medium 138 may be housed in a common controller housing with the one or more processors 136. In some embodiments, the memory medium 138 may be located remotely with respect to the physical location of the one or more processors 136 and controller 134. For instance, the one or more processors 136 of controller 134 may access a remote memory (e.g., server), accessible through a network (e.g., internet, intranet, and the like). Therefore, the above description should not be interpreted as a limitation on the present invention but merely an illustration.

Figure 7:
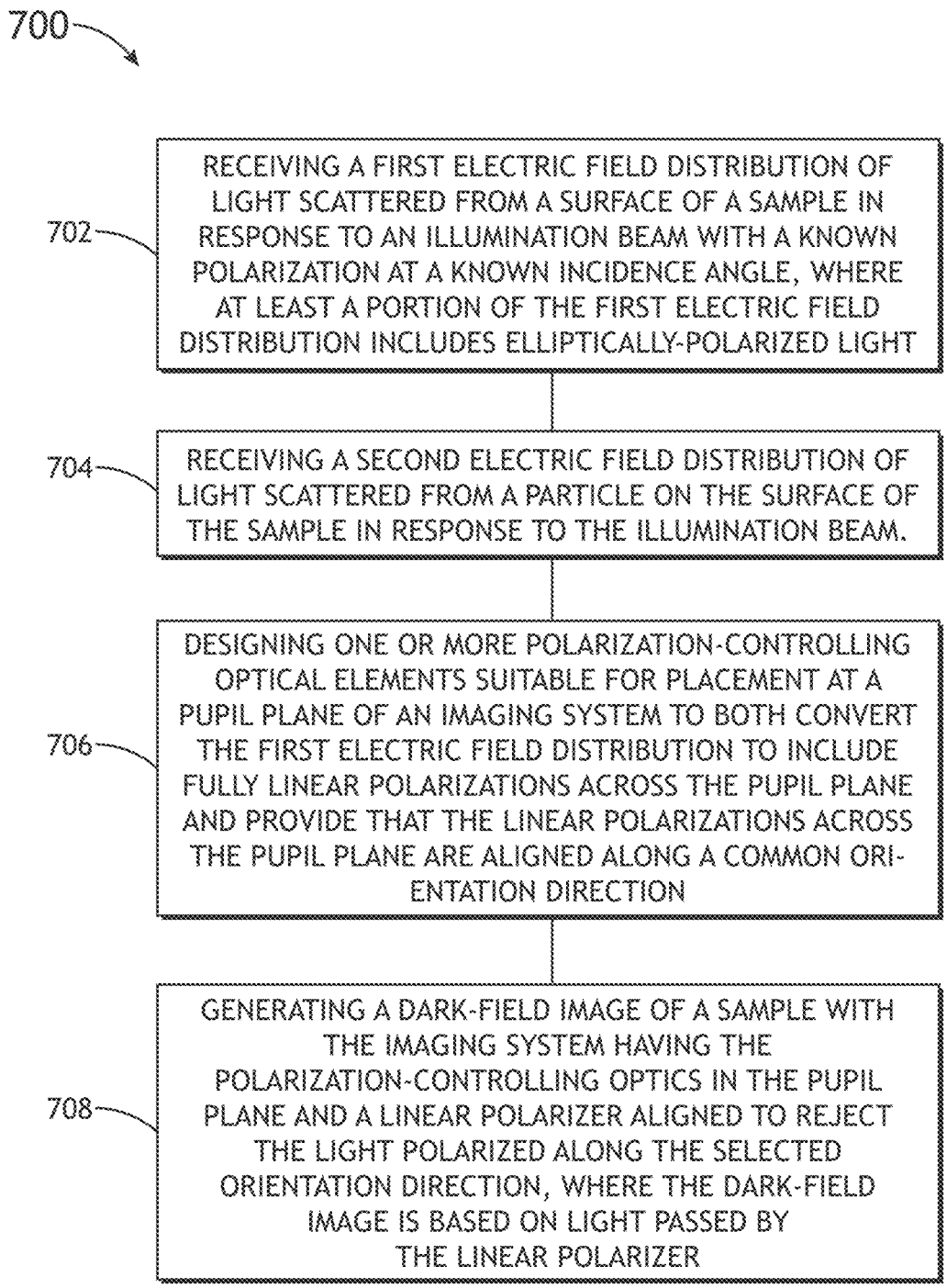
FIG. 7 is a flow diagram illustrating steps performed in a method for particle detection, in accordance with one or more embodiments of the present disclosure.

Referring now to FIG. 7, FIG. 7 is a flow diagram illustrating steps performed in a method 700 for particle detection, in accordance with one or more embodiments of the present disclosure. Applicant notes that the embodiments and enabling technologies described previously herein in the context of the particle detection system 100 should be interpreted to extend to the method 700. It is further noted, however, that the method 700 is not limited to the architecture of the particle detection system 100.

In one embodiment, the method 700 includes a step 702 of receiving a first electric field distribution of light scattered from a surface of a sample (e.g., surface haze) in response to an illumination beam with a known polarization at a known incidence angle, where at least a portion of the first electric field distribution includes elliptically-polarized light. In another embodiment, the method 700 includes a step 704 of receiving a second electric field distribution of light scattered from a particle on the surface of the sample in response to the illumination beam.

For example, it may be the case that surface haze may have a different electric field distribution in a pupil plane of an imaging system than light scattered by particles on the surface. In particular, it is recognized herein that surface haze and particle scattering have substantially different electric field distributions when scattered by obliquely-incident p-polarized light.

In another embodiment, the method 700 includes a step 706 of designing one or more polarization-controlling optical elements (e.g., a CDER 104) suitable for placement at a pupil plane of an imaging system to both convert the first electric field distribution to include fully linear polarizations across the pupil plane and provide that the linear polarizations across the pupil plane are aligned along a common orientation direction (e.g., a haze orientation direction). In some embodiments, the common orientation direction is substantially different than polarization directions of light in the second electric field distribution. In this way, the first electric field distribution may be manipulated and distinguished from the second electric field distribution using the polarization-controlling optics.

It is contemplated herein that the polarization-controlling optical elements (e.g., forming a CDER 104) designed in 706 may be provided in various configurations within the spirit and scope of the present disclosure. For example, the polarization-controlling optical elements may include a first polarization rotator to rotate the polarizations of the light associated with the first electric field distribution to a first common orientation direction, a quarter waveplate to convert all polarizations across the pupil to linear polarizations, and a second polarization rotator to rotate the linear polarizations to a second common orientation direction, which may be the same or different than the first common orientation direction. By way of another example, the polarization-controlling optical elements may include a single polarization rotator and a quarter waveplate, where the single polarization rotator rotates the polarizations of the light associated with the first electric field distribution to an intermediate distribution such that the light across the pupil is both linearly polarized and aligned across a common orientation direction after propagating through the quarter-wave plate. By way of a further example, the polarization-controlling optical elements may include a segmented waveplate including multiple segments distributed across the pupil plane. For example, each of the segments may be formed from a birefringent material with an optic axis in the pupil plane and a thickness configured to both convert light incident on the segment to linear polarization and further to provide that the linear polarizations are aligned along an orientation direction common to the other segments.

In another embodiment, the method 700 includes a step 708 of generating a dark-field image of a sample with the imaging system having the polarization-controlling optics in the pupil plane and a linear polarizer aligned to reject the light polarized along the selected orientation direction, where the dark-field image is based on light passed by the linear polarizer. For example, the light passed by the polarizer may correspond to light scattered by one or more particles on the surface of the sample within a selected tolerance, where surface haze has been suppressed.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   an illumination source configured to generate an illumination beam;
   one or more illumination optics to direct the illumination beam to a sample at an off-axis angle along an illumination direction;
   one or more collection optics to collect scattered light from the sample in response to the illumination beam in a dark-field mode, wherein the scattered light from the sample collected by the one or more collection optics includes surface haze associated with light scattered from a surface of the sample, wherein at least a portion of the surface haze has elliptical polarizations;
   one or more optical elements located at one or more pupil planes of the one or more collection optics comprising:
   a first polarization rotator providing a first spatially-varying polarization rotation distribution to rotate the surface haze to a selected orientation direction, wherein rotation of the surface haze includes rotation of long axes of the elliptical polarizations to the selected orientation direction;
   a quarter-wave plate to convert the surface haze from the first polarization rotator to linear polarizations; and a second polarization rotator providing a second spatially-varying polarization rotation distribution to rotate the linear polarizations of the surface haze from the quarter-wave plate to a selected haze orientation direction;
a linear polarizer aligned to reject light polarized parallel to the selected haze orientation direction to reject the surface haze from the second polarization rotator; and
a detector to generate a dark-field image of the sample based on scattered light from the sample passed by the linear polarizer, wherein the scattered light from the sample passed by the linear polarizer includes at least a portion of light scattered by one or more particles on the surface of the sample.

2. The system of claim 1, wherein the one or more illumination optics are configured to direct the illumination beam to the sample with a p-polarization.

3. The system of claim 1, wherein the linear polarizer comprises:
a polarizing beamsplitter, wherein the polarizing beamsplitter directs the scattered light from the sample passed by the polarizer along a first optical path, wherein the polarizer directs the surface haze along a second optical path different than the first optical path.

4. The system of claim 3, further comprising:
an additional detector configured to generate a dark-field image of the sample based on the surface haze along the second optical path.

5. The system of claim 1, wherein at least one of the first or second polarization rotators comprises:
a segmented half-wave plate.

6. The system of claim 5, wherein the segmented half-wave plate comprises:
a linearly-segmented half-wave plate including a plurality of segments distributed in the pupil plane.

7. The system of claim 6, wherein the plurality of segments is distributed along a direction orthogonal to the illumination direction in the pupil plane.

8. The system of claim 1, wherein at least one of the first or the second polarization rotators comprises:
an optically-active material with a spatially-varying thickness to provide the corresponding first or second spatially-varying polarization rotation distribution.

9. The system of claim 8, wherein the optically-active material is oriented with an optic axis orthogonal to a corresponding pupil plane of the one or more pupil planes.

10. The system of claim 8, wherein the optically-active material comprises:
quartz.

11. The system of claim 8, wherein the at least one of the first or the second polarization rotators further comprises:
a phase compensator to equalize optical path lengths of the surface haze passing through the optically-active material.

12. The system of claim 11, wherein the phase compensator is formed from an optically homogenous material along a propagation direction through the phase compensator.

13. The system of claim 11, wherein the phase compensator is formed from an optically active material along a propagation direction through the phase compensator having an opposite handedness of the optically-active material.

14. The system of claim 1, wherein the one or more optical elements located at the one or more pupil planes of the one or more collection optics further comprise:
a phase mask to provide different phase shifts for light in two or more pupil regions of a collection area to reshape a point spread function of light scattered from the one or more particles on the surface of the sample.

15. The system of claim 14, wherein the phase mask reshapes the point spread function of the light scattered from the one or more particles on the surface of the sample to provide a central peak in the point spread function.

16. The system of claim 1, wherein the selected haze orientation direction is parallel to the selected orientation direction.

17. The system of claim 1, wherein the selected haze orientation direction is orthogonal to the selected orientation direction.

18. A system comprising:
an illumination source configured to generate an illumination beam;
one or more illumination optics to direct the illumination beam to a sample at an off-axis angle along an illumination direction;
one or more collection optics to collect scattered light from the sample in response to the illumination beam in a dark-field mode, wherein the scattered light from the sample collected by the one or more collection optics includes surface haze associated with light scattered from a surface of the sample, wherein at least a portion of the surface haze has elliptical polarizations;
one or more optical elements located at one or more pupil planes of the one or more collection optics comprising:
a polarization rotator providing a spatially-varying polarization rotation distribution to rotate the surface haze to a selected orientation distribution, wherein rotation of the surface haze includes rotation of long axes of the elliptical polarizations to the selected orientation distribution; and
a segmented quarter-wave plate to convert the surface haze from the polarization rotator to linear polarizations, wherein the linear polarizations are aligned along a selected haze orientation direction;
a linear polarizer aligned to reject light polarized parallel to the selected haze orientation direction to reject the surface haze from the segmented quarter-wave plate; and
a detector to generate a dark-field image of the sample based on scattered light from the sample passed by the linear polarizer, wherein the scattered light from the sample passed by the linear polarizer includes at least a portion of light scattered by one or more particles on the surface of the sample.

19. The system of claim 18, wherein the one or more illumination optics are configured to direct the illumination beam to the sample with a p-polarization.

20. The system of claim 18, wherein the linear polarizer comprises:
a polarizing beamsplitter, wherein the polarizing beamsplitter directs the scattered light from the sample passed by the polarizer along a first optical path, wherein the polarizer directs the surface haze along a second optical path different than the first optical path.

21. The system of claim 20, further comprising:
an additional detector configured to generate a dark-field image of the sample based on the surface haze along the second optical path.

22. The system of claim 18, wherein the polarization rotator comprises:
a segmented half-wave plate.

23. The system of claim 22, wherein the segmented half-wave plate comprises:

a linearly-segmented half-wave plate including a plurality of segments distributed in the pupil plane.

24. The system of claim 23, wherein the plurality of segments is distributed along a direction orthogonal to the illumination direction in the pupil plane.

25. The system of claim 18, wherein the polarization rotator comprises:
an optically-active material with a spatially-varying thickness to provide the corresponding first or second spatially-varying polarization rotation distribution.

26. The system of claim 25, wherein the optically-active material is oriented with an optic axis orthogonal to a corresponding pupil plane of the one or more pupil planes.

27. The system of claim 25, wherein the optically-active material comprises:
quartz.

28. The system of claim 25, wherein the polarization rotator further comprises:
a phase compensator to equalize optical path lengths of the surface haze passing through the optically-active material.

29. The system of claim 28, wherein the phase compensator is formed from an optically homogenous material along a propagation direction through the phase compensator.

30. The system of claim 28, wherein the phase compensator is formed from an optically active material along a propagation direction through the phase compensator having an opposite handedness of the optically-active material.

31. The system of claim 18, wherein the one or more optical elements located at the one or more pupil planes of the one or more collection optics further comprise:
a phase mask to provide different phase shifts for light in two or more pupil regions of a collection area to reshape a point spread function of light scattered from the one or more particles on the surface of the sample.

32. The system of claim 31, wherein the phase mask reshapes the point spread function of the light scattered from the one or more particles on the surface of the sample to provide a central peak in the point spread function.

33. The system of claim 18, wherein the selected haze orientation direction is parallel to the selected orientation direction.

34. The system of claim 18, wherein the selected haze orientation direction is orthogonal to the selected orientation direction.

35. A system comprising:
an illumination source configured to generate an illumination beam;
one or more illumination optics to direct the illumination beam to a sample at an off-axis angle along an illumination direction;
one or more collection optics to collect scattered light from the sample in response to the illumination beam in a dark-field mode, wherein the scattered light from the sample collected by the one or more collection optics includes surface haze associated with light scattered from a surface of the sample, wherein at least a portion of the surface haze has elliptical polarizations;
one or more optical elements located at one or more pupil planes of the one or more collection optics comprising:
a spatially-varying waveplate located at a pupil plane of the one or more collection optics to convert the surface haze to linear polarizations; and
a polarization rotator providing a spatially-varying polarization rotation distribution to rotate the surface haze from the spatially-varying waveplate to a selected orientation distribution, wherein rotation of the surface haze includes rotation of long axes of the elliptical polarizations to a selected haze orientation direction;
a linear polarizer aligned to reject light polarized parallel to the selected haze orientation direction to reject the surface haze from the polarization rotator; and
a detector to generate a dark-field image of the sample based on scattered light from the sample passed by the linear polarizer, wherein the scattered light from the sample passed by the linear polarizer includes at least a portion of light scattered by one or more particles on the surface of the sample.

36. The system of claim 35, wherein the spatially-varying waveplate comprises:
a continuously-varying waveplate.

37. The system of claim 35, wherein the spatially-varying waveplate comprises:
a segmented waveplate.

38. The system of claim 35, wherein the one or more illumination optics are configured to direct the illumination beam to the sample with a p-polarization.

39. The system of claim 35, wherein the linear polarizer comprises:
a polarizing beamsplitter, wherein the polarizing beamsplitter directs the scattered light from the sample passed by the polarizer along a first optical path, wherein the polarizer directs the surface haze along a second optical path different than the first optical path.

40. The system of claim 39, further comprising:
an additional detector configured to generate a dark-field image of the sample based on the surface haze along the second optical path.

41. The system of claim 35, wherein segmented half-wave plate comprises:
a linearly-segmented waveplate including a plurality of segments distributed in the pupil plane.

42. The system of claim 41, wherein the plurality of segments is distributed along a direction orthogonal to the illumination direction in the pupil plane.

43. The system of claim 35, wherein the polarization rotator comprises:
an optically-active material with a spatially-varying thickness to provide the corresponding first or second spatially-varying polarization rotation distribution.

44. The system of claim 43, wherein the optically-active material is oriented with an optic axis orthogonal to a corresponding pupil plane of the one or more pupil planes.

45. The system of claim 43, wherein the optically-active material comprises:
quartz.

46. The system of claim 43, wherein the polarization rotator further comprises:
a phase compensator to equalize optical path lengths of the surface haze passing through the optically-active material.

47. The system of claim 46, wherein the phase compensator is formed from an optically homogenous material along a propagation direction through the phase compensator.

48. The system of claim 46, wherein the phase compensator is formed from an optically active material along a propagation direction through the phase compensator having an opposite handedness of the optically-active material.

49. The system of claim 35, wherein the one or more optical elements located at the one or more pupil planes of the one or more collection optics further comprise:

a phase mask to provide different phase shifts for light in two or more pupil regions of a collection area to reshape a point spread function of light scattered from the one or more particles on the surface of the sample.

50. The system of claim 49, wherein the phase mask reshapes the point spread function of the light scattered from the one or more particles on the surface of the sample to provide a central peak in the point spread function.

51. The system of claim 35, wherein the selected haze orientation direction is parallel to the selected orientation direction.

52. The system of claim 35, wherein the selected haze orientation direction is orthogonal to the selected orientation direction.

* * * * *